(12) United States Patent
Liu et al.

(10) Patent No.: US 9,853,486 B2
(45) Date of Patent: Dec. 26, 2017

(54) RESONANT WIRELESS POWER RECEIVER CIRCUIT AND CONTROL METHOD THEREOF

(71) Applicant: RICHTEK TECHNOLOGY CORPORATION, Zhubei, HsinChu (TW)

(72) Inventors: Kuo-Chi Liu, Hsinchu (TW); Wei-Hsin Wei, Zhubei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 168 days.

(21) Appl. No.: 15/040,558

(22) Filed: Feb. 10, 2016

(65) Prior Publication Data
US 2016/0254679 A1    Sep. 1, 2016

Related U.S. Application Data

(60) Provisional application No. 62/121,461, filed on Feb. 26, 2015.

(51) Int. Cl.
*H02J 7/00*   (2006.01)
*H02J 7/02*   (2016.01)
*H02J 50/12*  (2016.01)

(52) U.S. Cl.
CPC .............. *H02J 7/025* (2013.01); *H02J 50/12* (2016.02)

(58) Field of Classification Search
None
See application file for complete search history.

(56) References Cited

U.S. PATENT DOCUMENTS

| | | | |
|---|---|---|---|
| 8,796,887 B2 | 8/2014 | Von Novak et al. | |
| 9,419,469 B2* | 8/2016 | Chiang | H02J 7/025 |
| 2011/0053500 A1 | 3/2011 | Menegoli et al. | |
| 2012/0293118 A1 | 11/2012 | Kim et al. | |
| 2015/0022017 A1 | 1/2015 | Kim et al. | |
| 2015/0097438 A1* | 4/2015 | Aioanei | H02J 7/025 |
| | | | 307/104 |
| 2016/0336756 A1* | 11/2016 | Holzworth | H02J 7/025 |
| 2017/0005532 A1* | 1/2017 | Akuzawa | H02J 17/00 |

* cited by examiner

*Primary Examiner* — Jeffrey Zweizig
(74) *Attorney, Agent, or Firm* — Tung & Associates

(57) ABSTRACT

A resonant wireless power receiver circuit includes an adjustable impedance matching circuit and a receiver circuit, the impedance matching circuit and the receiver circuit in combination receive a wireless power and generate a resonant output. A rectifier is coupled to the combination of the adjustable impedance matching circuit and the receiver circuit to rectify the resonant output to generate a rectified output. The impedance of the adjustable impedance matching circuit is controlled by a feedback control circuit such that the load impedance of rectified output is regulated at a pre-determined impedance value, or the voltage of the rectified output is regulated at a pre-determined voltage value.

30 Claims, 18 Drawing Sheets

RESONANT WIRELESS POWER RECEIVER CIRCUIT AND CONTROL METHOD THEREOF

CROSS REFERENCE

The present invention claims priority to U.S. 62/121,461, filed on Feb. 26, 2015.

BACKGROUND OF THE INVENTION

Field of Invention

The present invention relates to a resonant wireless power receiver circuit. Particularly it relates to a resonant wireless power receiver circuit with an adjustable impedance matching circuit. The present invention also relates to a control circuit and the control method of the resonant wireless power receiver circuit.

Description of Related Art

FIG. 1 shows a prior art resonant wireless power system 1, which includes a resonant wireless power transmitter circuit 20 and a resonant wireless power receiver circuit 30, wherein the resonant wireless power transmitter circuit 20 includes a power supply 21, a driver 22, an impedance matching circuit 23, and a transmitter circuit 24. The resonant wireless power receiver circuit 30 includes a receiver circuit 31, an impedance matching circuit 32, a rectifier 33, a DC-DC converter 34, and a load 35.

In FIG. 1, the resonant wireless power transmitter circuit 20 transmits power to a wireless field 40 (for example but not limited to a magnetic field, an electric field, or an electromagnetic field). The wireless power transmitted to the wireless field 40 is received by the resonant wireless power receiver circuit 30 through the resonant effect of the receiver circuit 31 in cooperation with the impedance matching circuit 32, byway of for example but not limited to coupling, induced by, or capturing the wireless power in the wireless field 40. The power received is rectified by the rectifier 33, converted by the DC-DC converter 34, and then provided to the load 35, achieving the wireless power transmission.

FIG. 1B and FIG. 1C show two examples of the combination of the receiver circuit and the impedance matching circuit of the prior art resonant wireless power transmitter circuit shown in FIG. 1A. The receiver circuit 311 and the impedance matching circuit 321 shown in FIG. 1B are configured in parallel for resonance, while the receiver circuit 312 and the impedance matching circuit 322 in FIG. 1C are configured in serial for resonance.

The prior art circuits shown in FIG. 1A-1C has a drawback that the capacitance of the capacitor (e.g. the C1 in FIGS. 1B and 1C) in the resonant wireless power receiver circuit 30 is constant, and therefore the resonant frequency thereof is constant. However, in case of off resonance, or in case the distance between the resonant wireless power receiver circuit 30 and resonant wireless power transmitter circuit 20 is too far, the output voltage of the rectifier 33 may be too low, which could lead to malfunction of the circuits of the following stages (e.g. the DC-DC converter 34 and the load 35 in FIG. 1A).

FIGS. 2A and 2B show another prior art resonant wireless power receiver circuit. The resonant wireless power receiver circuit 30 includes a 1×/2× active rectifier 38 (the details thereof are shown in FIG. 2B). The 1×/2× active rectifier 38 can rectify the wirelessly received AC voltage to a selectable one time (1×) or two times (2×) rectified output voltage to solve the aforementioned low output voltage problem of the rectifier.

However, the prior art circuits shown in FIG. 2A-2B have the following drawbacks. First, the circuit of 1×/2× active rectifier 38 is very complicated and needs a large number of devices. Second, there are only two options for the output voltage. However, as described in the above, the level of the resonant power received by the resonant wireless power receiver circuit 30 is uncertain, and it is possible in certain circumstances that 1× is too low while 2× is too high, such that the circuits of the following stages either cannot function normally or are damaged.

The present invention provides a feedback controlled rectifier output. The present invention is advantageous over the prior art in FIG. 1A-1C in that the low output voltage problem is avoided.

Compared to the prior art in FIG. 2A-2B, the present invention has the advantage of providing a continuously adjustable rectifier output, such that the output voltage of the rectifier is well controlled, not too high and not too low. Further, the present invention uses less components and is more cost effective compared with the prior art.

SUMMARY OF THE INVENTION

From one perspective, the present invention provides a resonant wireless power receiver circuit having a load impedance of rectified output, and configured to operably receive a wireless power and convert the wireless power to a DC conversion output which is supplied to a load, the resonant wireless power receiver circuit comprising: a receiver circuit, which includes at least a receiver coil; an adjustable impedance matching circuit, coupled to the receiver circuit, wherein the adjustable impedance matching circuit and the receiver circuit in combination are configured to operably receive the wireless power and generate a resonant output; a rectifier, which is coupled to the combination of the adjustable impedance matching circuit and the receiver circuit, and configured to operably rectify the resonant output to a rectified output, wherein the rectified output includes a rectified output voltage and a rectified output current; a DC-DC converter, which is coupled to the rectifier and the load, and configured to operably convert the rectified output to the DC conversion output, wherein the DC conversion output includes a DC conversion output current, and wherein the load impedance of rectified output includes an input impedance of the DC-DC converter; and a feedback control circuit, which is coupled to the rectifier and the adjustable impedance matching circuit, and configured to operably generate an impedance control signal according the rectified output voltage and the rectified output current, to control the impedance of the adjustable impedance matching circuit such that the load impedance of rectified output is regulated at a pre-determined impedance value.

From another perspective, the present invention provides a resonant wireless power receiver circuit, which has a load impedance of rectified output, and configured to operably receive a wireless power and convert the wireless power to a DC conversion output to a load, the resonant wireless power receiver circuit comprising: a receiver circuit, which includes at least a receiver coil; an adjustable impedance matching circuit, coupled to the receiver circuit, wherein the adjustable impedance matching circuit and the receiver circuit in combination are configured to operably receive the wireless power and generate a resonant output; a rectifier, which is coupled to the combination of the adjustable impedance matching circuit and the receiver circuit, and configured to operably rectify the resonant output to a rectified output, wherein the rectified output includes a rectified output voltage and a rectified output current; a DC-DC converter, which is coupled to the rectifier and the load, and configured to operably convert the rectified output to the DC conversion output, wherein the DC conversion output includes a DC conversion output current, and wherein the load impedance of rectified output includes an input impedance of the DC-DC converter; and a feedback control circuit, which is coupled to the adjustable impedance matching circuit, and configured to operably generate an impedance control signal according the rectified output voltage, to control the impedance of the adjustable impedance matching circuit such that the rectified output voltage is regulated at a pre-determined voltage value.

In one embodiment, the feedback control circuit includes a comparison circuit which is configured to operably compare the rectified output voltage with a reference voltage, and the feedback control circuit is configured to operably generate the impedance control signal according to an output signal of the comparison circuit.

In one embodiment, the feedback control circuit is coupled to the DC-DC converter, and is further configured to operably generate a conversion control signal, to control the DC conversion output current of the DC-DC converter according to the rectified output voltage and the rectified output current such that the rectified output voltage is not less than a pre-determined lower limit.

In one embodiment, the feedback control circuit includes a comparison circuit which is configured to operably compare the rectified output voltage with a reference voltage, and the feedback control circuit is configured to operably generate the impedance control signal according to an output signal of the comparison circuit, to control the impedance of the adjustable impedance matching circuit such that the rectified output voltage is not higher than a pre-determined upper limit.

In one embodiment, the adjustable impedance matching circuit includes one or more variable capacitor circuits; the feedback control circuit is configured to operably adjust the reactance of the one or more variable capacitor circuits according to the impedance control signal so as to adjust the impedance of the adjustable impedance matching circuit; the one or more variable capacitor circuits and the receiver circuit are connected in parallel, in series, or in combination of parallel and series; and when there are two or more variable capacitor circuits, the two or more variable capacitor circuits are connected in parallel, in series, or in combination of parallel and series.

In one embodiment, the variable capacitor circuit includes at least a varactor, and the feedback control circuit is configured to operably adjust the reactance of the varactor according to the impedance control signal, to thereby adjust the reactance of the variable capacitor circuit.

In one embodiment, the variable capacitor circuit includes one or more switches and one or more capacitors, wherein the one or more switches and one or more capacitors are connected in parallel, in series, or in combination of parallel and series; and the feedback control circuit is configured to operably control the conduction of the one or more switches according to the impedance control signal, to thereby adjust the reactance of the variable capacitor circuit.

From another perspective, the present invention provides a feedback control circuit, which is configured to operably control a resonant wireless power receiver circuit which has a load impedance of rectified output, wherein the resonant wireless power receiver circuit is configured to operably receive a wireless power and convert the wireless power to a DC conversion output to a load, the resonant wireless power receiver circuit comprising a receiver circuit, which includes at least a receiver coil; an adjustable impedance matching circuit, coupled to the receiver circuit, wherein the adjustable impedance matching circuit and the receiver circuit in combination are configured to operably receive the wireless power and generate a resonant output; a rectifier, which is coupled to the combination of the adjustable impedance matching circuit and the receiver circuit, and configured to operably rectify the resonant output to a rectified output, wherein the rectified output includes a rectified output voltage and a rectified output current; and a DC-DC converter, which is coupled to the rectifier and the load, and configured to operably convert the rectified output to the DC conversion output, wherein the DC conversion output includes a DC conversion output current, and wherein the load impedance of rectified output includes an input impedance of the DC-DC converter; the feedback control circuit being coupled to the rectifier and the adjustable impedance matching circuit, and comprising: a reference voltage generator, which is configured to operably generate a first reference voltage according to the rectified output current, wherein the first reference voltage corresponds to the product of the rectified output current multiplied by a pre-determined impedance value; and an impedance controller, which is configured to operably generate an impedance control signal according to the rectified output voltage and the first reference voltage, to control the impedance of the adjustable impedance matching circuit such that the rectified output voltage corresponds to the first reference voltage, to thereby regulate the load impedance of rectified output at the pre-determined impedance value.

From another perspective, the present invention provides a feedback control circuit, which is configured to operably control a resonant wireless power receiver circuit, wherein the resonant wireless power receiver circuit is configured to operably receive a wireless power and convert the wireless power to a DC conversion output to a load, the resonant wireless power receiver circuit comprising a receiver circuit, which includes at least a receiver coil; an adjustable impedance matching circuit, coupled to the receiver circuit, wherein the adjustable impedance matching circuit and the receiver circuit in combination are configured to operably receive the wireless power and generate a resonant output; a rectifier, which is coupled to the combination of the adjustable impedance matching circuit and the receiver circuit, and configured to operably rectify the resonant output to a rectified output, wherein the rectified output includes a rectified output voltage and a rectified output current; and a DC-DC converter, which is coupled to the rectifier and the load, and configured to operably convert the rectified output to the DC conversion output, wherein the DC conversion output includes a DC conversion output current, and wherein the load impedance of rectified output includes an input impedance of the DC-DC converter; the feedback control circuit being coupled to the rectifier and the adjustable impedance matching circuit, and comprising: a first comparison circuit, which is configured to operably generate an error amplification signal according to the rectified output voltage and a first reference voltage; and an impedance controller, which is configured to operably generate an impedance control signal according to the error amplification signal, to control the impedance of the adjustable impedance matching circuit such that the rectified output voltage is regulated at a pre-determined voltage value.

In one embodiment, the feedback control circuit is coupled to the DC-DC converter, and further comprises: a second comparison circuit, which is configured to operably compare the rectified output voltage with a second reference voltage; wherein the impedance controller is configured to operably generate the impedance control signal further according to the output signal of the second comparison circuit and the rectified output current, to control the impedance of the adjustable impedance matching circuit, and the impedance controller is configured to operably generate a conversion control signal to control the DC conversion output current of the DC-DC converter, such that the rectified output voltage is not lower than a pre-determined lower limit.

In one embodiment, the feedback control circuit is coupled to the DC-DC converter, and further comprises: a second comparison circuit, which is configured to operably compare the rectified output voltage with a second reference voltage; wherein the impedance controller is configured to operably generate the impedance control signal further according to the output signal of the second comparison circuit, to control the impedance of the adjustable impedance matching circuit such that the rectified output voltage is not higher than a pre-determined upper limit.

From another perspective, the present invention provides a method for controlling a resonant wireless power receiver circuit which has a load impedance of rectified output, wherein the resonant wireless power receiver circuit is configured to operably receive a wireless power and convert the wireless power to a DC conversion output to a load, the resonant wireless power receiver circuit comprising a receiver circuit, which includes at least a receiver coil; an adjustable impedance matching circuit, coupled to the receiver circuit, wherein the adjustable impedance matching circuit and the receiver circuit in combination are configured to operably receive the wireless power and generate a resonant output; a rectifier, which is coupled to the combination of the adjustable impedance matching circuit and the receiver circuit, and configured to operably rectify the resonant output to a rectified output, wherein the rectified output includes a rectified output voltage and a rectified output current; and a DC-DC converter, which is coupled to the rectifier and the load, and configured to operably convert the rectified output to the DC conversion output, wherein the DC conversion output includes a DC conversion output current, and wherein the load impedance of rectified output includes an input impedance of the DC-DC converter, the control method comprising: generating an impedance control signal according the rectified output voltage and the rectified output current; and controlling the impedance of the adjustable impedance matching circuit according to the impedance control signal, such that the load impedance of rectified output is regulated at a pre-determined impedance value.

From another perspective, the present invention provides a method for controlling a resonant wireless power receiver circuit which is configured to operably receive a wireless power and convert the wireless power to a DC conversion output to a load, the resonant wireless power receiver circuit comprising a receiver circuit, which includes at least a receiver coil; an adjustable impedance matching circuit, coupled to the receiver circuit, wherein the adjustable impedance matching circuit and the receiver circuit in combination are configured to operably receive the wireless power and generate a resonant output; a rectifier, which is coupled to the combination of the adjustable impedance matching circuit and the receiver circuit, and configured to operably rectify the resonant output to a rectified output, wherein the rectified output includes a rectified output voltage and a rectified output current; and a DC-DC converter, which is coupled to the rectifier and the load, and configured to operably convert the rectified output to the DC conversion output, wherein the DC conversion output includes a DC conversion output current, and wherein the load impedance of rectified output includes an input impedance of the DC-DC converter, the control method comprising: generating an impedance control signal according to the rectified output voltage; and controlling the impedance of the adjustable impedance matching circuit according to the impedance control signal, such that the rectified output voltage is regulated at a pre-determined voltage value.

In one embodiment, the method further comprises: generating a conversion control signal according to the rectified output voltage and the rectified output current; and controlling the DC conversion output current of the DC-DC converter, such that the rectified output voltage is not lower than a pre-determined lower limit.

In one embodiment, the method further comprises: comparing the rectified output voltage with a reference voltage to generate a comparison result; and generating the impedance control signal according to the comparison result to control the impedance of the adjustable impedance matching circuit, such that the rectified output voltage is not higher than a pre-determined upper limit voltage value.

In one embodiment, the method further comprises: comparing the rectified output voltage with a reference voltage to generate a comparison result; and generating the impedance control signal according to the comparison result to control the impedance of the adjustable impedance matching circuit, such that the rectified output voltage is not higher than a pre-determined upper limit voltage value.

In one embodiment, the adjustable impedance matching circuit includes one or more variable capacitor circuits; the one or more variable capacitor circuits and the receiver circuit are connected in parallel, in series, or in combination of parallel and series, wherein when there are two or more variable capacitor circuits, the two or more variable capacitor circuits are connected in parallel, in series, or in combination of parallel and series; wherein the control method further comprises: adjusting the reactance of the variable capacitor circuit according to the impedance control signal so as to adjust the impedance of the adjustable impedance matching circuit.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1A:
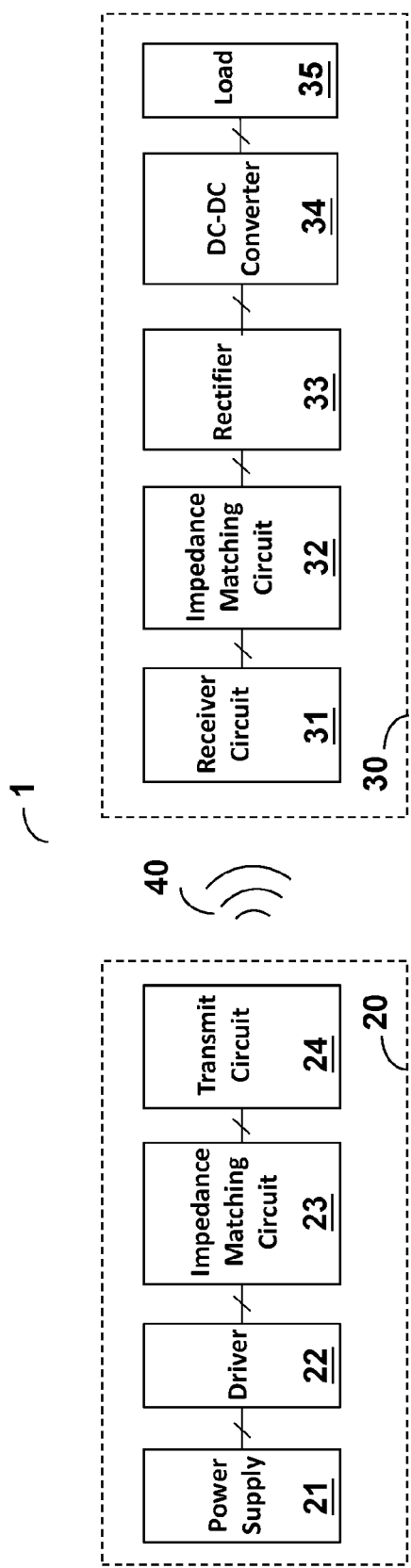
FIGS. 1A, 1B and 1C show schematic diagrams of a conventional resonant wireless power receiver circuit and the related circuits thereof.
Figure 1B:
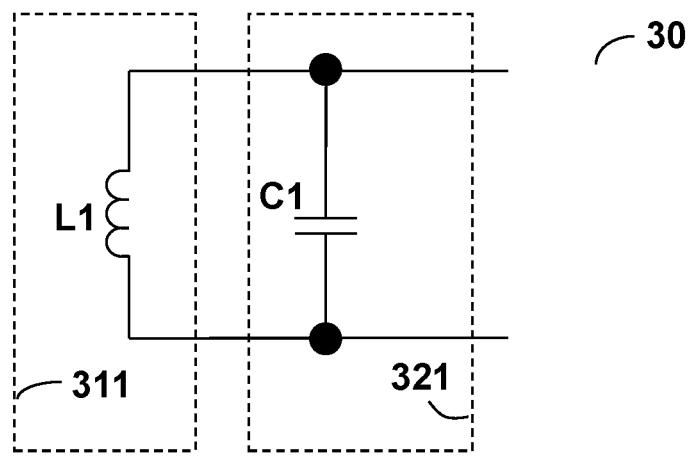
Figure 1C:
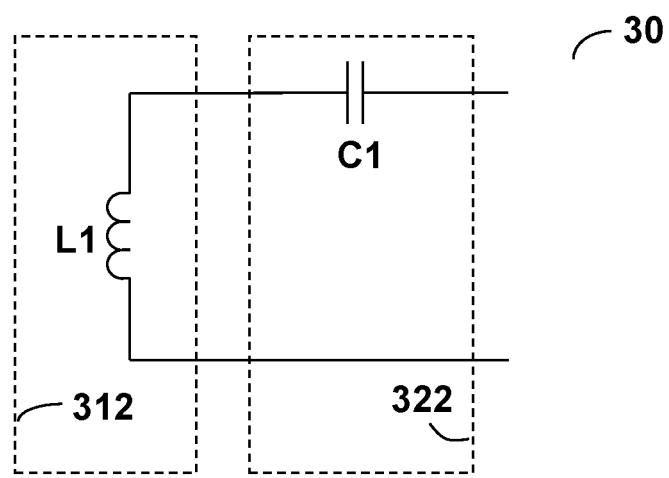
Figure 2A:
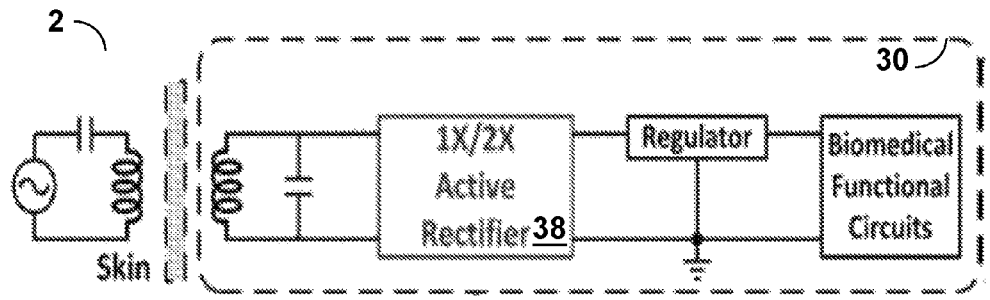
FIGS. 2A and 2B show schematic diagrams of another prior art resonant wireless power receiver circuit.
Figure 2B:
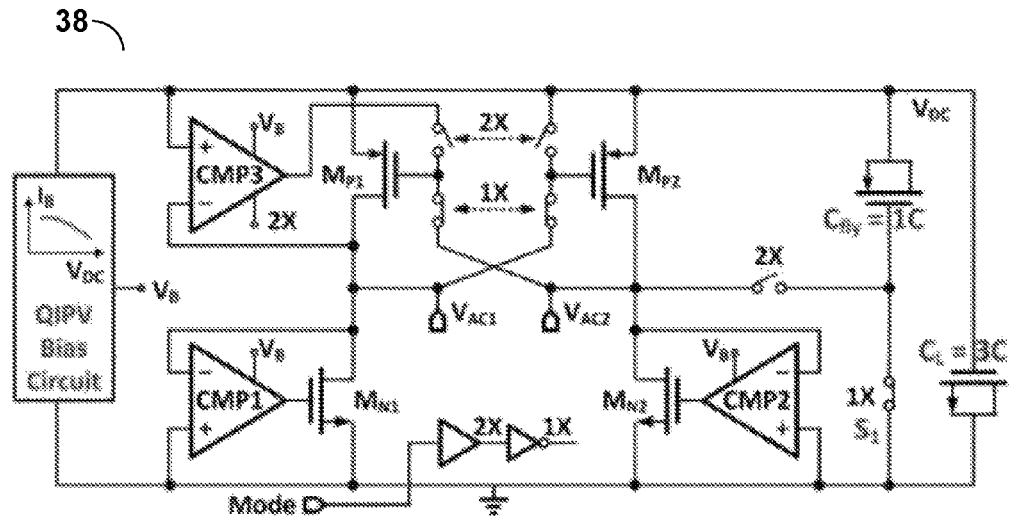
Figure 3:
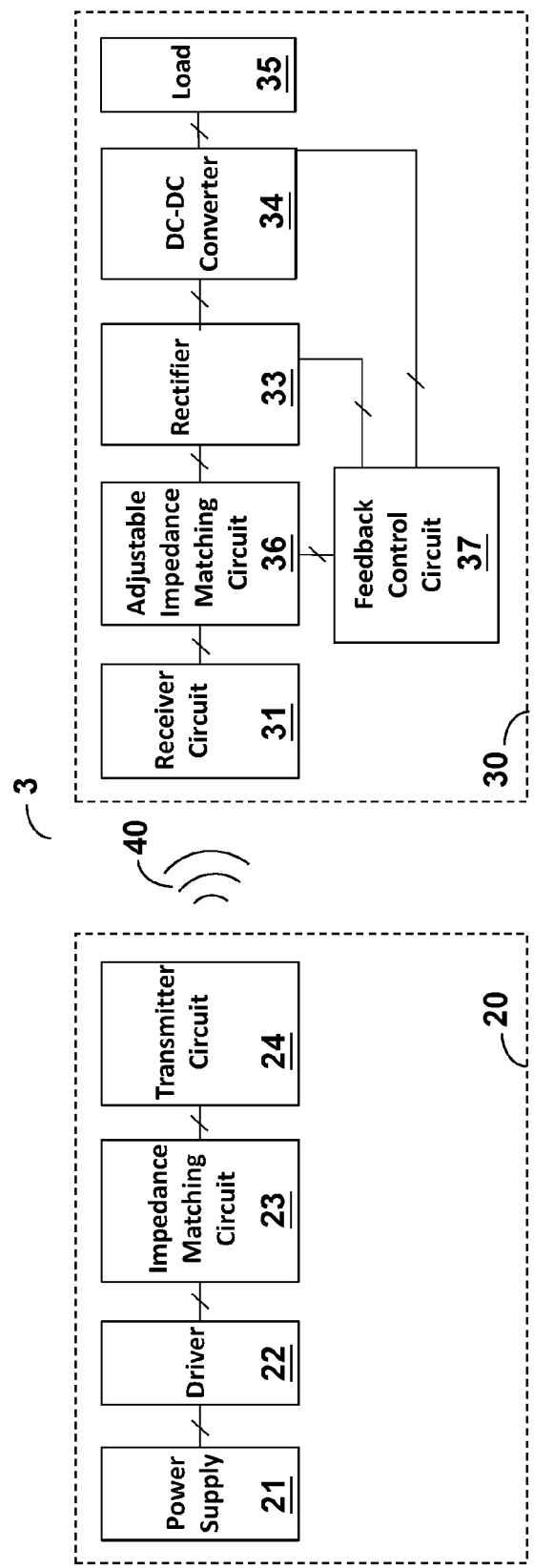
FIG. 3 shows the block diagram of an embodiment of the resonant wireless power receiver circuit and the resonant wireless power system according to the present invention.

FIG. 3 shows a resonant wireless power system 3 which includes a resonant wireless power transmitter circuit 20 and a resonant wireless power receiver circuit 30, wherein the resonant wireless power transmitter circuit 20 for example can be the resonant wireless power transmitter circuit 20 in FIG. 1 and wherein the resonant wireless power receiver circuit 30 is an embodiment according to the present invention.

In FIG. 3, the resonant wireless power receiver circuit 30 include a receiver circuit 31, an adjustable impedance matching circuit 36 coupled to the receiver circuit 31, a rectifier 33 coupled to the impedance matching circuit 36 and the receiver circuit 31, a DC-DC converter 34 coupled to the rectifier 33, and a load 35 coupled to the DC-DC converter 34.

In FIG. 3, the resonant wireless power transmitter circuit 20 transmits power to a wireless field 40 (for example but not limited to a magnetic field, an electric field, or an electromagnetic field). The wireless power transmitted to the wireless field 40 is received by the resonant wireless power receiver circuit 30 through the resonant effect of the receiver circuit 31 in cooperation with the adjustable impedance matching circuit 36, by way of for example but not limited to coupling, induced by, or capturing the wireless power in the wireless field 40. The power received is rectified by the rectifier 33, converted by the DC-DC converter 34, and then provided to the load 35, achieving the wireless power transmission. The DC-DC converter 34 may be for example but not limited to a charging circuit. The load 35 may be for example but not limited to a battery or other functional circuits. In FIG. 3, the resonant wireless power receiver circuit 30 according to the present invention further includes a feedback control circuit 37. The feedback control circuit 37 is coupled to the rectifier 33 and the adjustable impedance matching circuit 36 and/or the DC-DC converter 34 and is configured to operably generate an impedance matching signal to control the adjustable impedance matching circuit 36 and/or the DC-DC converter 34. Relevant details will be further described later.

Since the operation of the resonant wireless power system 3 shown in FIG. 3 is based on resonance, if the resonant frequency transmitted by the resonant wireless power transmitter circuit 20 drifts from the preset frequency, or if there is dislocation of the receiver circuit, or if there are multiple resonant wireless power receiver circuits coupled to receive the wireless power at the same time, off resonance could happen. If the off resonance is not corrected or controlled, it could cause power loss, and the received voltage (for example but not limited to the rectified output voltage of the rectifier 33 in this embodiment) may be too low to cause malfunction of the circuits in the following stages (for example but not limited to the DC-DC converter 34 and the load 35 in this embodiment). Besides, the inappropriate distance between the transmitter circuit and the receiver circuit may also cause the received voltage to be too high instead of too low. Nowadays there are more and more wireless power transmission applications, so in some circumstances, the resonant wireless power receiver circuit 30 may receive wireless power transmitted from non-corresponding wireless power systems or even from other wireless communication systems (for example but not limited to NFC, Near Field Communication). Under these unexpected circumstances, the voltage (for example but not limited to the rectified output voltage of the rectifier 33 in this embodiment) received by the resonant wireless power receiver circuit 30 could be too high. An overly high voltage due to any reason could cause damage of the internal circuit or damage of the load of the resonant wireless power receiver circuit 30 (for example but not limited to the DC-DC converter 34 and the load 35 in this embodiment).

In FIG. 3, the resonant wireless power receiver circuit according to the present invention can achieve several control modes through controlling the adjustable impedance matching circuit 36 and/or the DC-DC converter 34 by the feedback control circuit 37 to solve the aforementioned problems. The details thereof will be described later.

Figure 4A:
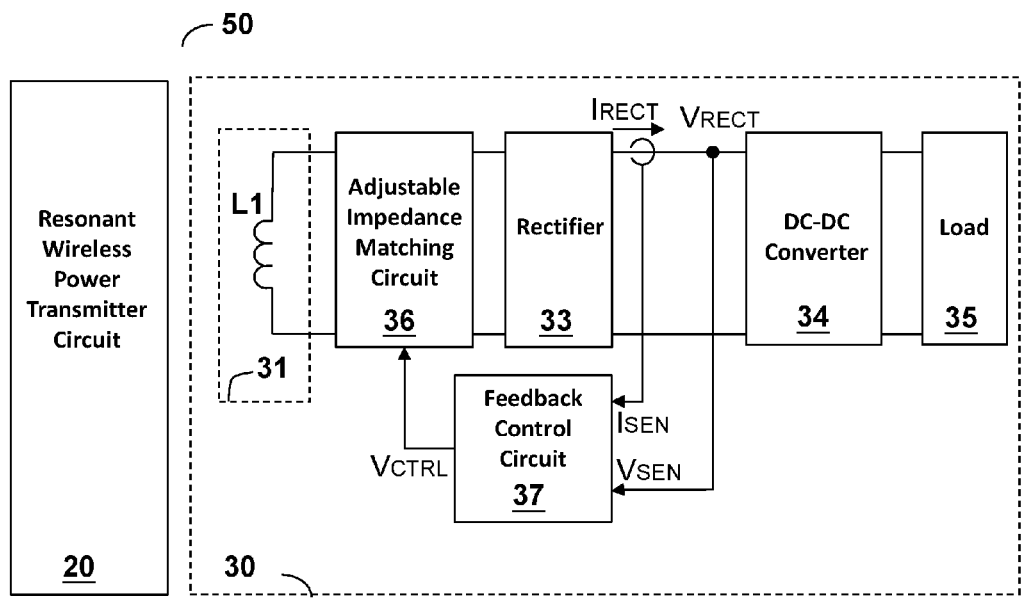
FIG. 4A shows the block diagram of another embodiment of the resonant wireless power receiver circuit according to the present invention.

FIG. 4 shows a resonant wireless power system 50, which includes a resonant wireless power transmitter circuit 20 and a more specific embodiment of the resonant wireless power receiver circuit (the resonant wireless power receiver circuit 30) according to the present invention. This embodiment can achieve a control mode of Constant Load Impedance of Rectified Output. In FIG. 4A, the resonant wireless power receiver circuit 30 comprises a receiver circuit 31 including at least a receiver coil L1; an adjustable impedance matching circuit 36 coupled to the receiver circuit 31, wherein the adjustable impedance matching circuit 36 and the receiver circuit 31 in combination receive a wireless power and generate a resonant output; a rectifier 33 coupled with the adjustable impedance matching circuit 36 and the receiver circuit 31, which rectifies the resonant output to generate a rectified output, wherein the rectified output includes a rectified output voltage $V_{RECT}$ and a rectified output current $I_{RECT}$; a DC-DC converter 34 coupled to the rectifier 33; a load 35 coupled to the DC-DC converter 34, which converts the rectified output to a DC conversion output to drive the load 35, wherein the circuit stages following the rectified output form a load impedance to the rectified output (Load Impedance of Rectified Output); wherein the load impedance of rectified output includes for example but not limited to the input impedance of the DC-DC converter 34; and a feedback control circuit 37 coupled to the rectifier 33 and the adjustable impedance matching circuit 36, wherein the feedback control circuit 37 generates an impedance control signal VCTRL according to the rectified output voltage $V_{RECT}$ and the rectified output current $I_{RECT}$, to control the impedance of the adjustable impedance matching circuit 36 for adjusting the load impedance of rectified output to a pre-determined impedance value (the pre-determined impedance value may be a constant or an adjustable variable, the same hereinafter). In one embodiment, the pre-determined impedance value is preferably not less than a reference impedance value. In one embodiment, to achieve the Constant Load Impedance of Rectified Output control mode, the load impedance of rectified output is preferably a fixed value.

Figure 4B:
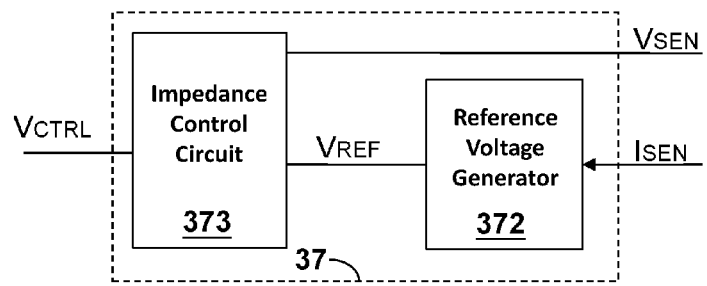
FIG. 4B shows the block diagram of an embodiment of the feedback control circuit of the resonant wireless power receiver circuit according to the present invention.

FIG. 4B shows a more specific embodiment of the feedback control circuit (the feedback control circuit 37) of the resonant wireless power receiver circuit according to the present invention shown in FIG. 4A. In FIG. 4B, the feedback control circuit 37 includes reference voltage generator 372, and the impedance control circuit 373 coupled to the reference voltage generator 372. The reference voltage generator 372 generates a reference voltage $V_{REF}$ according to a signal $I_{SEN}$ related to the rectified output current $I_{RECT}$. The reference voltage $V_{REF}$ corresponds to a target value of the rectified output voltage $V_{RECT}$. The target value corresponds to, for example but not limited to a product of the rectified output current $I_{RECT}$ multiplied by a pre-determined impedance value. The impedance control circuit 373 generates an impedance control signal VCTRL according to the reference voltage $V_{REF}$ and a signal $V_{SEN}$ related to the rectified output voltage $V_{RECT}$, to control the impedance of the adjustable impedance matching circuit 36 such that the relationship of the rectified output voltage $V_{RECT}$, the rectified output current $I_{RECT}$ and the load impedance of rectified output is shown as the equation below:

$$V_{RECT} = Z_{RECT} \times I_{RECT}$$

wherein $Z_{RECT}$ is the aforementioned pre-determined impedance value of the load impedance of rectified output. In one embodiment, the load impedance of rectified output is preferably regulated at a fixed value to achieve the Constant Load Impedance of Rectified Output control mode.

Figure 5:
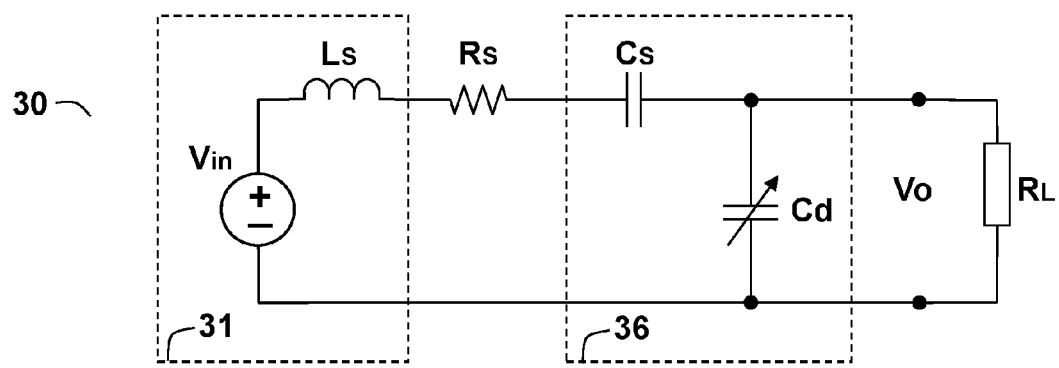
FIG. 5 shows the schematic diagram of the equivalent circuit of the resonant wireless power receiver circuit according to the present invention.

FIG. 5 shows the equivalent circuit diagram of the resonant wireless power receiver circuit according to the present invention. The equivalent circuit 30 includes an equivalent voltage source Vin received by the receiver circuit through induction, an equivalent inductor Ls of the receiver coil in the receiver circuit, an equivalent capacitor Cs of the receiver coil in the receiver circuit, an equivalent capacitor Cd of the adjustable impedance matching circuit (i.e., in one embodiment, the adjustable impedance matching circuit 36 in the aforementioned embodiments includes Cs and Cd), a parasitic resistor Rs of the resonant circuit, the equivalent output voltage Vo at the resonant output (corresponding to the rectified output of the rectifier 33 in the aforementioned embodiments, wherein the small signal equivalent circuit of the rectifier is a short circuit), and the equivalent load resistor RL (for example including the equivalent input impedance of the DC-DC converter 34 in the aforementioned embodiments).

Figure 6:
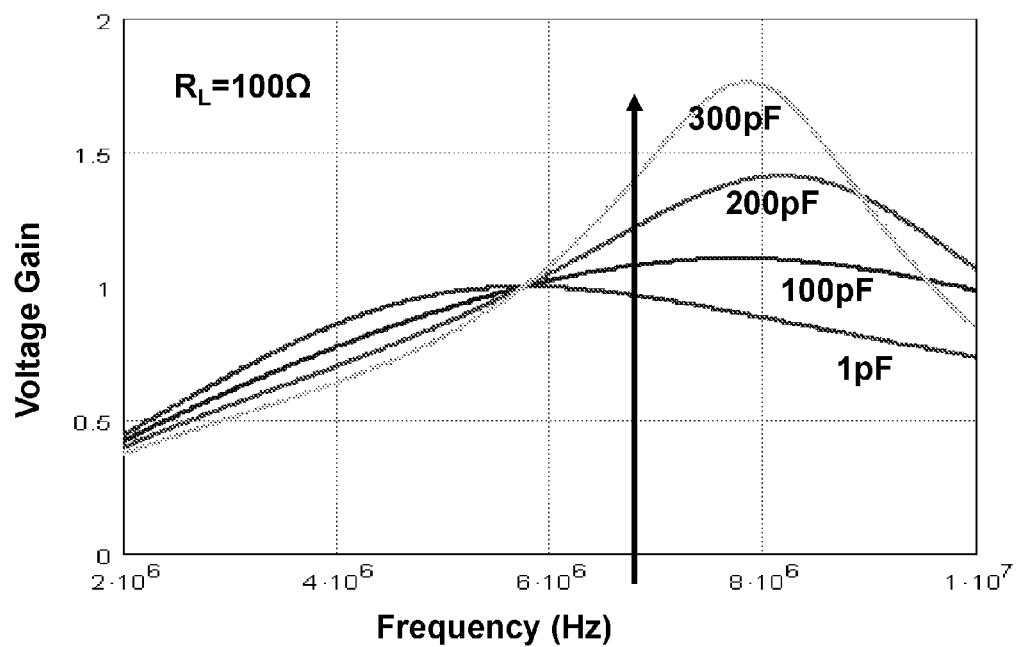
FIGS. 6 and 7 show simulated characteristics of the circuit shown in FIG. 5.

FIG. 6 shows the simulated voltage gain characteristic diagram of the output voltage Vo of the equivalent circuit 30 in FIG. 5. As shown in the figure, there are 4 different curves with 4 different Cd values, i.e. 1 pF, 100 pF, 200 pF, 300 pF. As an example, when the operating frequency is at 6.78 MHz (as shown with the arrowed line in the figure), the voltage gain of the resonant wireless power receiver circuit can be adjusted by controlling the Cd value.

Figure 7:
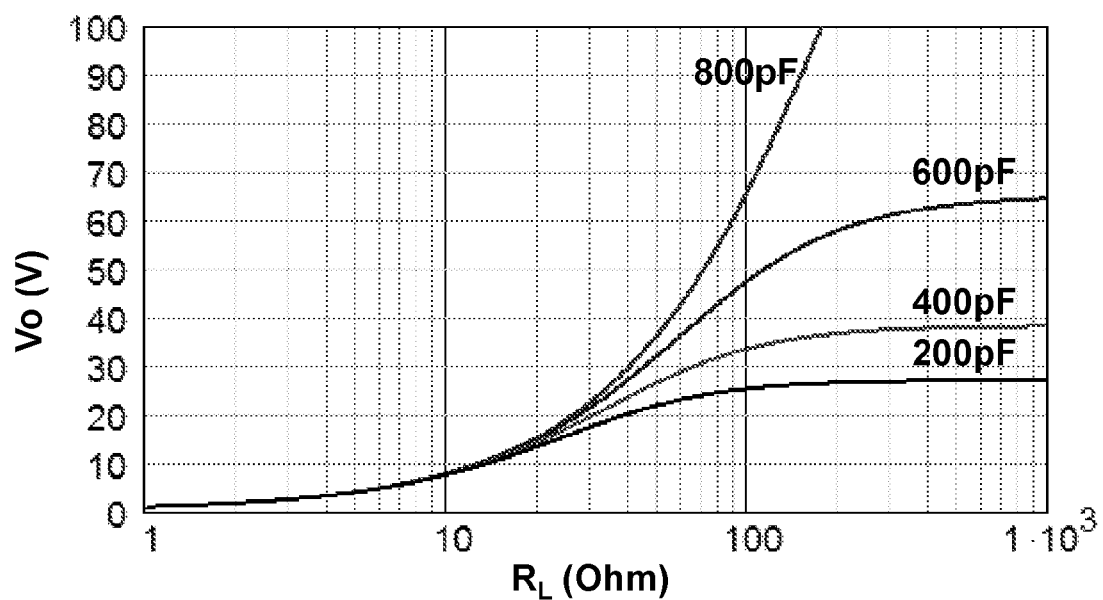

FIG. 7 shows the simulated characteristic diagram of the output voltage Vo of the equivalent circuit 30 in FIG. 5. There are 4 different curves with 4 different Cd values (i.e. 1 pF, 100 pF, 200 pF, 300 pF) with the load resistance as X axis. As shown in the figure, with relative higher RL values (for example but not limited to 100 ohm or higher), the equivalent output voltage Vo presents larger changes in correspondence with different Cd values.

Figure 8:
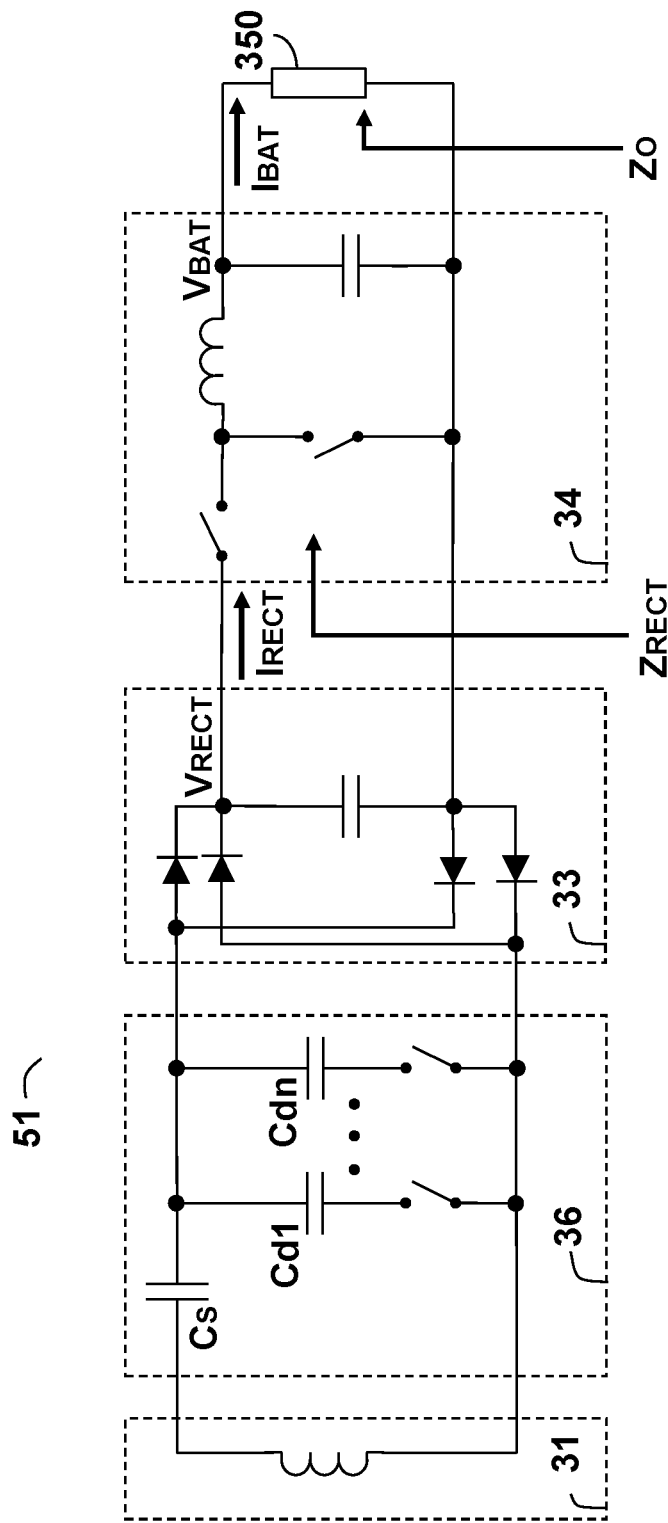
FIG. 8 shows the schematic diagram of another embodiment of the resonant wireless power receiver circuit according to the present invention.

FIG. 8 shows a more specific embodiment of the resonant wireless power receiver circuit according to the present invention (the resonant wireless power receiver circuit 51). The resonant wireless power receiver circuit 51 includes an adjustable impedance matching circuit 36. In this embodiment, the adjustable impedance matching circuit 36 includes for example but not limited to a variable capacitor circuit formed by impedance matching capacitors Cs, Cd1-Cdn and the corresponding switches S1-Sn as shown in the figure. The aforementioned changes of output voltage or voltage gain can be achieved by controlling the impedance of the adjustable impedance matching circuit 36 (by for example but not limited to controlling the conduction of the switches S1-Sn shown in the figure). There are other types of embodiments for the adjustable impedance matching circuits and will be described later. The resonant wireless power receiver circuit 51 also includes a rectifier 33 (for example but not limited to the full wave rectifier shown in the figure), a load 35 (for example but not limited to the battery 350 shown in the figure), and DC-DC converter 34 (functioning as a charging circuit in this embodiment).

In FIG. 8, the power received by the resonant wireless power receiver circuit 51 is full-wave rectified to generate a rectified output voltage $V_{RECT}$ and a rectified output current $I_{RECT}$. The resonant wireless power receiver circuit 51 has an output impedance Zo which is the equivalent impedance of the load (for example the battery 350 shown in the figure), and a load impedance of rectified output $Z_{RECT}$ which is the equivalent impedance of the whole loading (for example but not limited to the DC-DC converter 34 and the battery 350 shown in the figure) seen by the rectified output.

In FIG. 8, as described earlier, the feedback control circuit (for example may be the feedback control circuit 37 in FIG. 4B) can adjust the equivalent impedance of the adjustable impedance matching circuit 36 according to the rectified output current $I_{RECT}$, to control the rectified output voltage $V_{RECT}$ such that the relationship of the rectified output voltage $V_{RECT}$, the rectified output current $I_{RECT}$ and the load impedance of rectified output is shown as the equation below:

$$V_{RECT} = Z_{RECT} \times I_{RECT}$$

wherein $Z_{RECT}$ is a pre-determined impedance value of the load impedance of rectified output. In one embodiment, the load impedance of rectified output is preferably regulated at a fixed value (for example but not limited to 100 ohm shown in FIG. 7) to achieve the Constant Load Impedance of Rectified Output control mode.

The aforementioned Constant Load Impedance of Rectified Output control mode according to the present invention allows the resonant wireless power receiver circuit 30 to obtain a higher output voltage or a larger change in the voltage gain, such that even under an unfavorable condition such as the aforementioned off resonance or large distance between the resonant wireless power receiver circuit and the resonant wireless power transmitter circuit, the circuits in the following stages (for example but not limited to the DC-DC converter 34 and the battery 350 shown in the figure) can operate with a sufficient input voltage, and a better power transmission efficiency can be achieved.

Figure 9A:
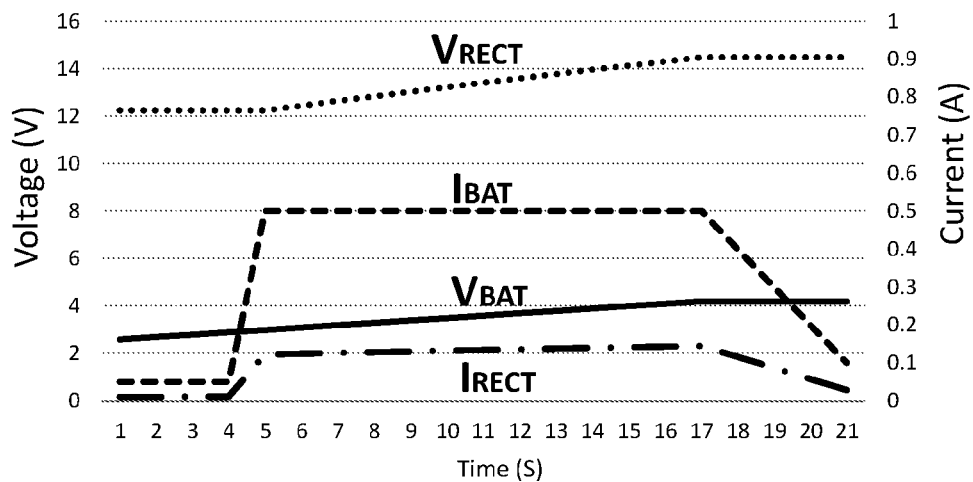
FIGS. 9A and 9B show simulated waveforms of the circuit shown in FIG. 8.
Figure 9B:
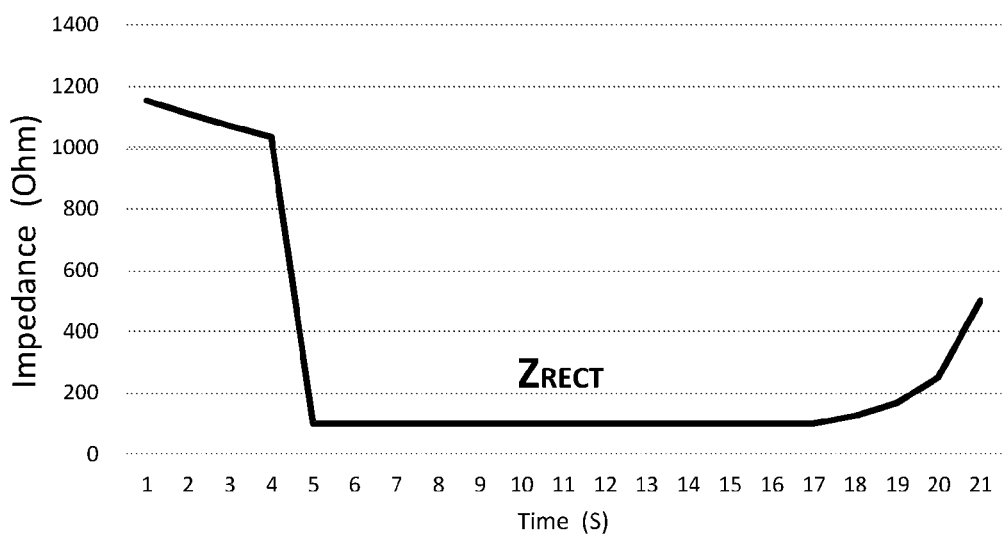

FIG. 9A is a simulated waveforms of voltages and currents versus time, wherein $V_{RECT}$ is the rectified output voltage, $I_{RECT}$ is the rectified output current, VBAT is the battery charging voltage, and IBAT is the battery charging current. In the example shown in the figure, from about 5 s to about 17 s, the charging circuit 34 operates in a Constant Current Mode wherein The charging current IBAT of the battery 350 is a fixed value. Since the charging current IBAT is constantly charging the battery 350, the charging voltage VBAT rises with a fixed slope. And because the load impedance of rectified output is expected to be regulated at a pre-determined impedance value $Z_{RECT}$, the rectified output voltage $V_{RECT}$ and the rectified output current $I_{RECT}$ also rise with fixed slopes. Hence, as shown in FIG. 9B, the load impedance of rectified output $Z_{RECT}$ is maintained at the pre-determined output impedance value (for example 100 ohm as shown in the figure) from about 5 s to about 17 s. As such, the resonant wireless power receiver circuit 51 as shown in FIG. 8 can enjoy the advantages provided by the Constant Load Impedance of Rectified Output control mode.

In addition to regulating the load impedance of rectified output at a pre-determined constant output impedance value for better output voltage and power transmission efficiency, the present invention can also be applied for another application. Using the resonant wireless power receiver circuit 51 in FIG. 8 as an example, under some circumstances, the rectified output voltage $V_{RECT}$ may not be high enough for the circuits of the following stages (for example but not limited to the DC-DC converter 34 as shown in the figure) to operate normally, and this could lead to malfunction of the whole circuitry. The causes may be for example due to a large output current of the DC-DC converter 34 or other unfavorable conditions which leads to limited amount of power received by wireless induction. The present invention disclose a Constant Rectified Output Voltage (Constant $V_{RECT}$) control mode to solve the aforementioned problem, as described hereinafter.

Figure 10A:
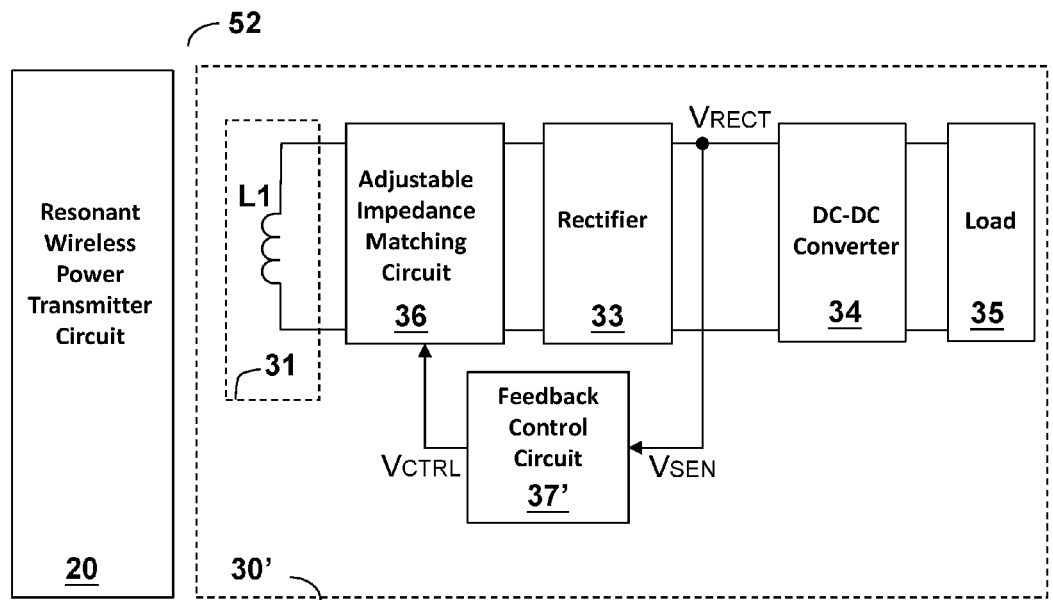
FIG. 10A shows the schematic diagram of another embodiment of the resonant wireless power receiver circuit according to the present invention.

In FIG. 10A, the resonant wireless power system 52 includes a resonant wireless power transmitter circuit 20 and a resonant wireless power receiver circuit 30', wherein resonant wireless power receiver circuit 30' is another embodiment according to the present invention. This embodiment can achieve Constant Rectified Output Voltage (Constant $V_{RECT}$) control mode. This embodiment is similar to the embodiment in FIG. 4A, but is different in that this embodiment in FIG. 10A does not require sensing the rectified output current.

Figure 10B:
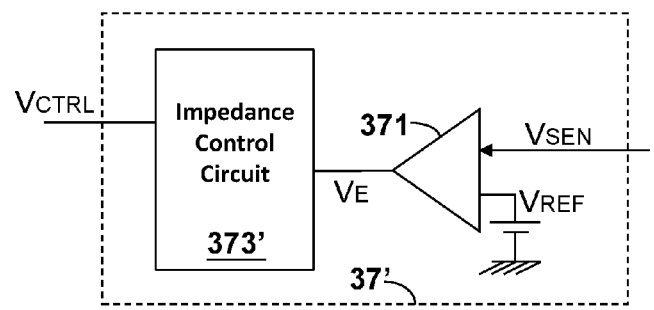
FIG. 10B shows the schematic diagram of another embodiment of the feedback control circuit of the resonant wireless power receiver circuit according to the present invention.
Figure 11:
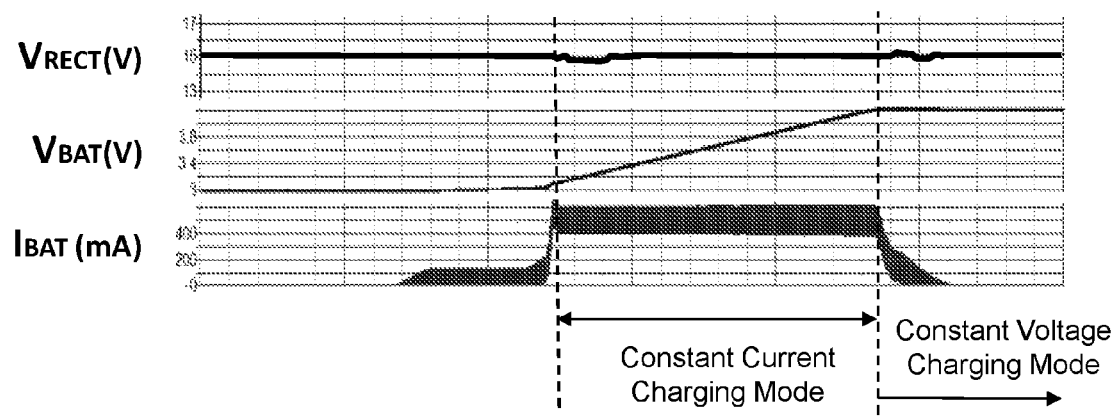
FIG. 11 shows simulated waveforms of the circuit shown in FIGS. 10A and 10B.

FIG. 10B shows a more specific embodiment of the feedback control circuit in FIG. 10A (a feedback control circuit 37'). The feedback control circuit 37' includes a comparison circuit 371 and an impedance control circuit 373'. The comparison circuit 371 compares a signal $V_{SEN}$ with a reference voltage $V_{REF}$ to generate an error signal VE, wherein the signal $V_{SEN}$ is related to the rectified output voltage $V_{RECT}$ (for example but not limited to $V_{RECT}$ itself or a division of $V_{RECT}$). The impedance control circuit 373' generate a impedance control signal VCTRL according to the error signal VE to control the impedance of the adjustable impedance matching circuit 36 such that the rectified output voltage $V_{RECT}$ is regulated at pre-determined voltage value (the "pre-determined" voltage value may be a fixed value or an adjustable variable, the same hereinafter); in one embodiment, the pre-determined voltage value is preferably fixed to achieve the Constant Rectified Output Voltage (Constant $V_{RECT}$) control mode. The reference voltage VRECT is set as the following equation:

$$ZRECT = \frac{ZO}{D^2} = \frac{\frac{VBAT}{IBAT}}{\left(\frac{VBAT}{VRECT}\right)^2} = \frac{VRECT^2}{VBAT \times ZRECT}$$

$$VRECT = \sqrt{ZRECT \times VBAT \times IBCC}$$

wherein $Z_{RECT}$ is a pre-determined impedance value of the rectified output load impedance, VBAT is the battery voltage (the battery 350 in FIG. 8, for example), IBCC is the charging current of the charging circuit (the charging circuit corresponds to the aforementioned DC-DC converter 34, the same hereinafter) operating in constant current charging mode. The simulation diagram of the aforementioned operation is shown in FIG. 11. The rectified output voltage $V_{RECT}$ is regulated at a fixed voltage value regardless whether the charging circuit operates in the constant current mode or the constant voltage mode.

In addition, the embodiments shown in FIGS. 10A and 10B can also be applied for overvoltage protection to protect the system circuits. As mentioned earlier, due to various reasons (for example but not limited to receiving wireless power transmitted by some other non-corresponding resonant wireless power transmitter circuit (not shown)), the output voltage of the resonant wireless power receiver circuit 30 (for example but not limited to the rectified output voltage $V_{RECT}$) could possibly be too high and lead to damage of the circuits in the following stages. This embodiment can solve this problem. The comparator 371 in the feedback control circuit 37 compares the signal $V_{SEN}$ with the reference voltage $V_{REF}$, wherein the signal $V_{SEN}$ is related to the rectified output voltage $V_{RECT}$. When $V_{SEN}$ is close to or larger than $V_{REF}$, the feedback control circuit 37 can control the impedance of the adjustable impedance matching circuit 36 to decrease the rectified output voltage $V_{RECT}$ for overvoltage protection.

Figure 12A:
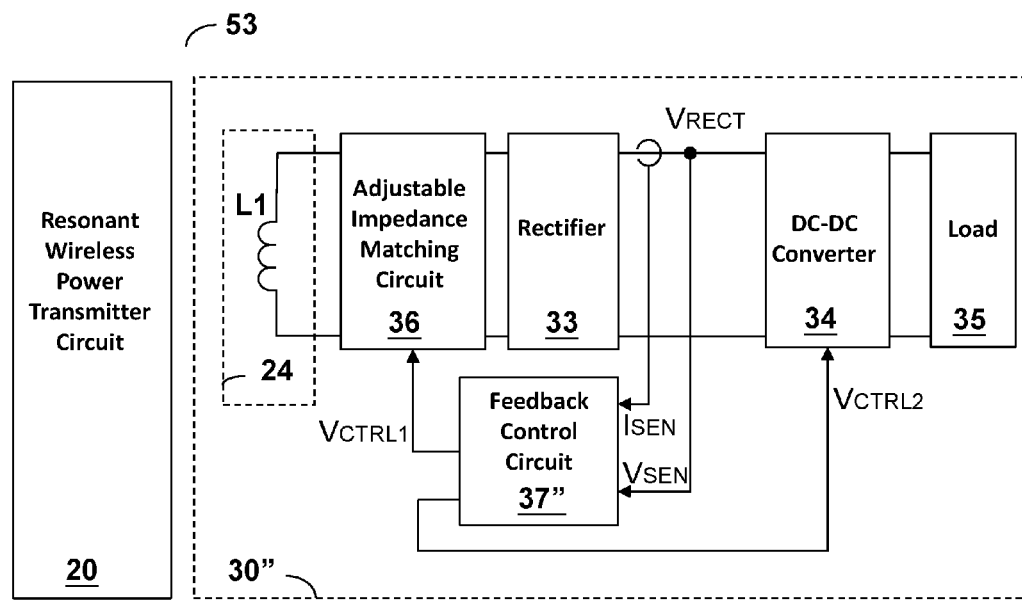
FIG. 12A shows the schematic diagram of another embodiment of the resonant wireless power receiver circuit according to the present invention.

In FIG. 12A, the resonant wireless power system 53 includes a resonant wireless power transmitter circuit 20 and a resonant wireless power receiver circuit 30", wherein resonant wireless power receiver circuit 30" is another embodiment according to the present invention. This embodiment can achieve Minimum. Output Voltage (Minimum $V_{RECT}$) control mode. This embodiment is similar to the embodiment in FIG. 4A, but is different in that the feedback control circuit 37" of this embodiment in FIG. 12A provides an output coupled to the DC-DC converter 34. This embodiment can generate an impedance control signal VCTRL1 and a conversion control signal VCTRL2 according to the rectified output voltage $V_{RECT}$ and the rectified output current $I_{RECT}$. The impedance control signal VCTRL1 is for controlling the impedance of the adjustable impedance matching circuit 36, and the conversion control signal VCTRL2 is for controlling (for example but not limited to decreasing) the output current of the DC-DC converter 34 (for example but not limited to the charging current when the DC-DC converter 34 is the charging circuit), such that the rectified output voltage $V_{RECT}$ is not less than a pre-determined voltage value to achieve the Minimum Output Voltage (Minimum $V_{RECT}$) control mode for solving the aforementioned malfunction problem caused by insufficient rectified output voltage. When the rectified output voltage $V_{RECT}$ is higher than the pre-determined voltage value, the output current of the DC-DC converter 34 can be kept at a normal level. The aforementioned Minimum Output Voltage (Minimum $V_{RECT}$) control mode can be used in combination with the aforementioned Constant Rectified Output Voltage (Constant $V_{RECT}$) control mode or Constant Load Impedance of Rectified Output control mode.

Figure 12B:
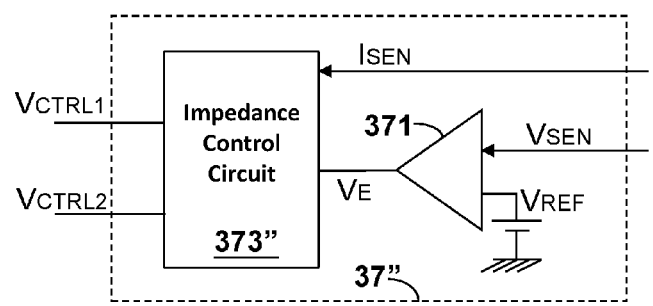
FIG. 12B shows the schematic diagram of another embodiment of the feedback control circuit of the resonant wireless power receiver circuit according to the present invention.

FIG. 12B shows a more specific embodiment of the aforementioned feedback control circuit 37". The feedback control circuit 37" includes a comparison circuit 371 and an impedance control circuit 373". The comparison circuit 371 compares a signal $V_{SEN}$ and a reference voltage $V_{REF}$ to generate an error signal VE, where in the signal $V_{SEN}$ is related to the rectified output voltage $V_{RECT}$. The impedance control circuit 373" generates the impedance control signal VCTRL1 and the conversion control signal VCTRL2 according to the error signal and a signal $I_{SEN}$ which is related the rectified output current $I_{RECT}$.

Figure 13:
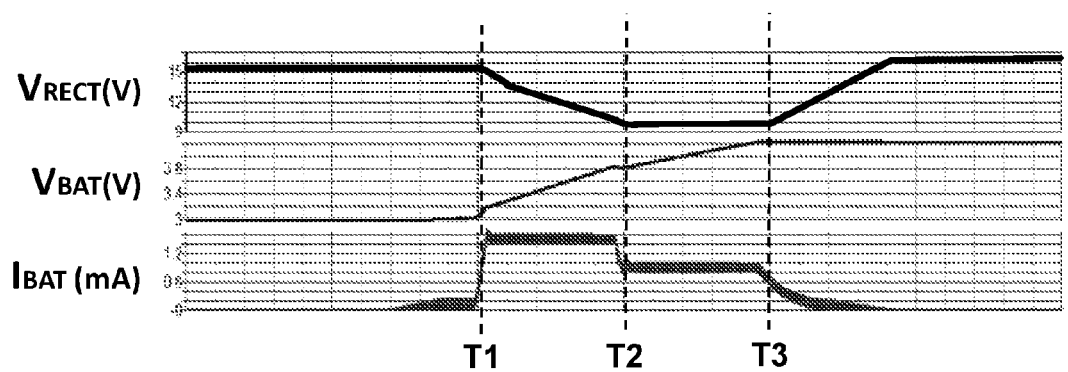
FIG. 13 shows simulated waveforms of the circuit shown in FIGS. 12A and 12B.

FIG. 13 shows the simulation waveforms of the circuit shown in FIG. 12A, wherein the circuit operates in Minimum Output Voltage (Minimum $V_{RECT}$) control mode in combination with Constant Rectified Output Voltage (Constant $V_{RECT}$) control mode. In FIG. 13, during T1 to T2 time interval, the output current (for example the aforementioned battery charging current IBAT) of the DC-DC converter 34 is too large and it causes the rectified output voltage $V_{RECT}$ to decrease. When the rectified output voltage $V_{RECT}$ decreases to a voltage corresponding to the pre-determined reference voltage $V_{REF}$, the battery charging current IBAT is reduced during T2 to T3 time interval in FIG. 13 to maintain the rectified output voltage $V_{RECT}$ not to be lower than the minimum $V_{RECT}$ (for example but not limited to the voltage corresponding to the reference voltage $V_{REF}$) to ensure the normal operation of the system. In the intervals outside the T1 to T3 time interval, the resonant wireless power receiver circuit operates in Constant Rectified Output Voltage (Constant $V_{RECT}$) control mode.

The adjustable impedance matching circuit is not limited to the example in FIG. 8. FIGS. 14A-14D and 15A-15E show resonant wireless power receiver circuit 61-69 according to the present invention, wherein the adjustable impedance matching circuit 36 includes at least a variable capacitor circuit (e.g. 361-363), and preferably but not necessarily, the adjustable impedance matching circuit 36 can further include an impedance matching capacitor (e.g. C1). The variable capacitor circuit of the adjustable impedance matching circuit 36 can be coupled to the receiver circuit 31 and/or the impedance matching capacitor (e.g. C1) in parallel, in series or in combination of parallel and series.

Figure 14A:
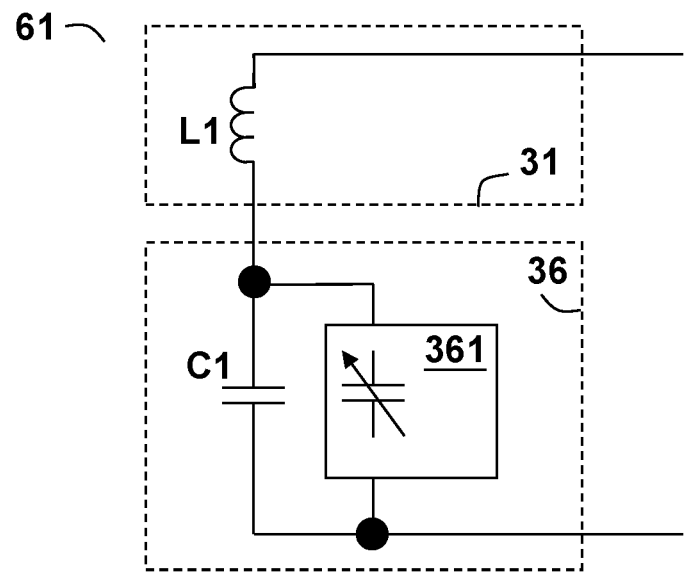
FIG. 14A-14D and FIG. 15A-15E show schematic diagrams of several embodiments of the receiver circuit in combination with the adjustable impedance matching circuit of the resonant wireless power receiver circuit according to the present invention.

In FIG. 14A, the adjustable impedance matching circuit 36 is coupled to the receiver circuit 31 in series, wherein the adjustable impedance matching circuit 36 includes a variable capacitor circuit 361 and an impedance matching capacitor C1, and the variable capacitor circuit 361 and the impedance matching capacitor C1 are connected in parallel.

Figure 14B:
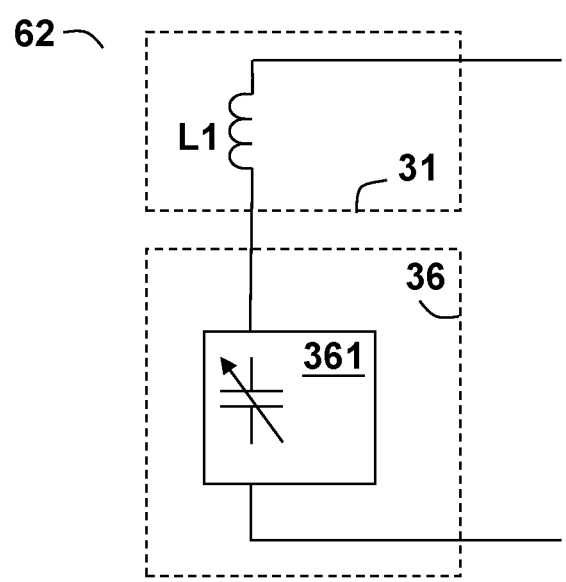

In FIG. 14B, the adjustable impedance matching circuit 36 is coupled to the receiver circuit 31 in series, wherein the adjustable impedance matching circuit 36 includes a variable capacitor circuit 361.

Figure 14C:
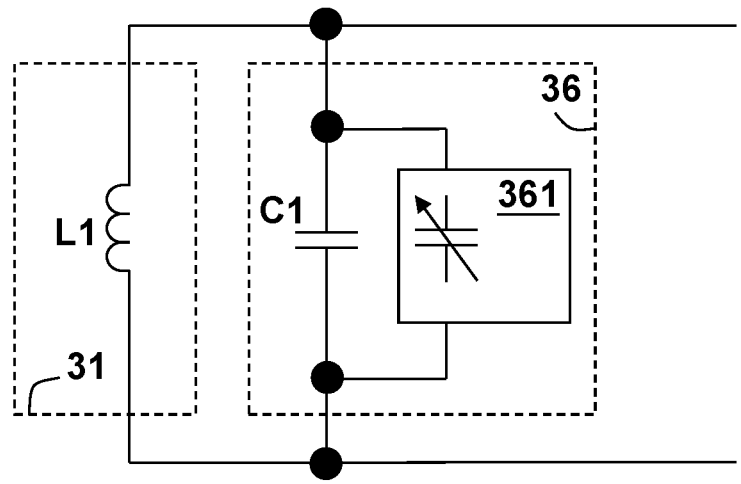

In FIG. 14C, the adjustable impedance matching circuit 36 is coupled to the receiver circuit 31 in parallel, wherein the adjustable impedance matching circuit 36 includes a variable capacitor circuit 361 and an impedance matching capacitor C1, and the variable capacitor circuit 361 and the impedance matching capacitor C1 are connected in parallel.

Figure 14D:
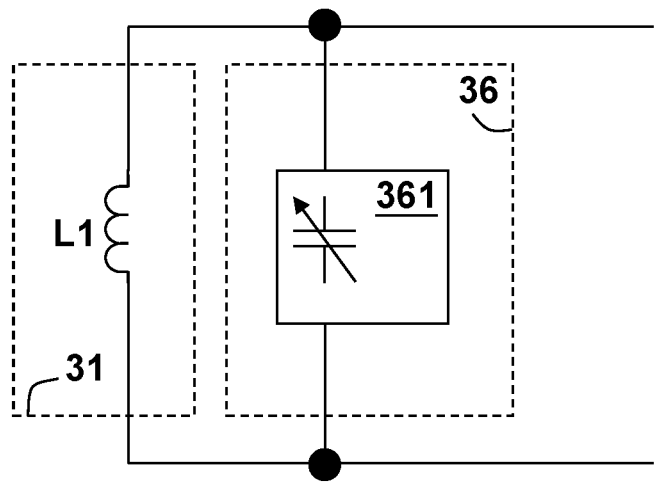

In FIG. 14D, the adjustable impedance matching circuit 36 is coupled to the receiver circuit 31 in parallel, wherein the adjustable impedance matching circuit 36 includes a variable capacitor circuit 361.

Figure 15A:
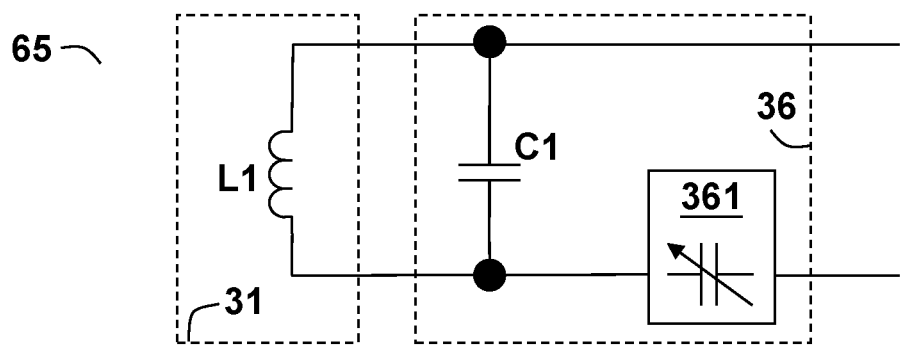

In FIGS. 15A-15E, the adjustable impedance matching circuit 36 is coupled to the receiver circuit 31 in combination of parallel and series. In FIG. 15A, the adjustable impedance matching circuit 36 includes a variable capacitor circuit 361 and an impedance matching capacitor C1, wherein the receiver circuit 31 and the impedance matching capacitor C1 are connected in parallel and the combination is then coupled to the variable capacitor circuit 361 in series.

Figure 15B:
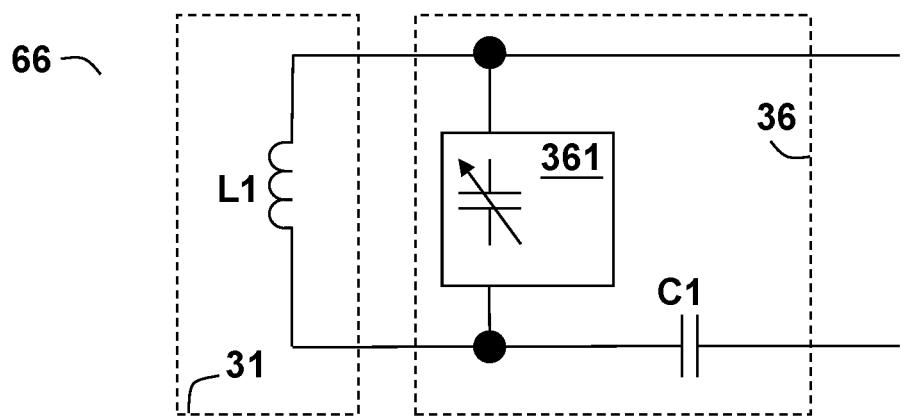

In FIG. 15B, the adjustable impedance matching circuit 36 includes a variable capacitor circuit 361 and an impedance matching capacitor C1, wherein the receiver circuit 31 and the variable capacitor circuit 361 are connected in parallel and the combination is then coupled to the impedance matching capacitor C1 in series.

Figure 15C:
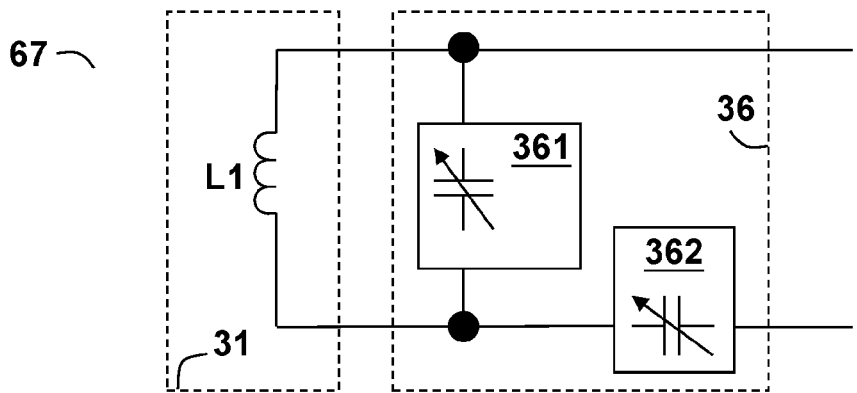

In FIG. 15C, the adjustable impedance matching circuit 36 includes variable capacitor circuits 361 and 362, wherein the receiver circuit 31 and the variable capacitor circuit 361 are connected in parallel and the combination is then coupled to the variable capacitor circuit 362 in series.

Figure 15D:
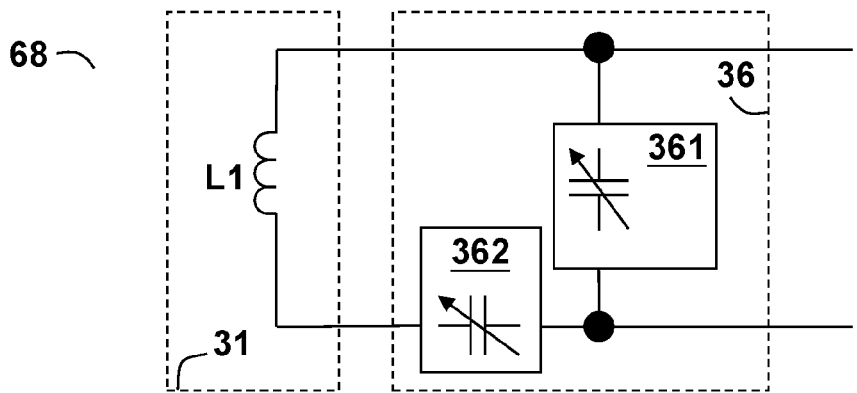

In FIG. 15D, the adjustable impedance matching circuit 36 includes variable capacitor circuits 361 and 362, wherein the receiver circuit 31 are connected the variable capacitor circuit 362 in series and the combination is then coupled to the variable capacitor circuit 361 in parallel.

Figure 15E:
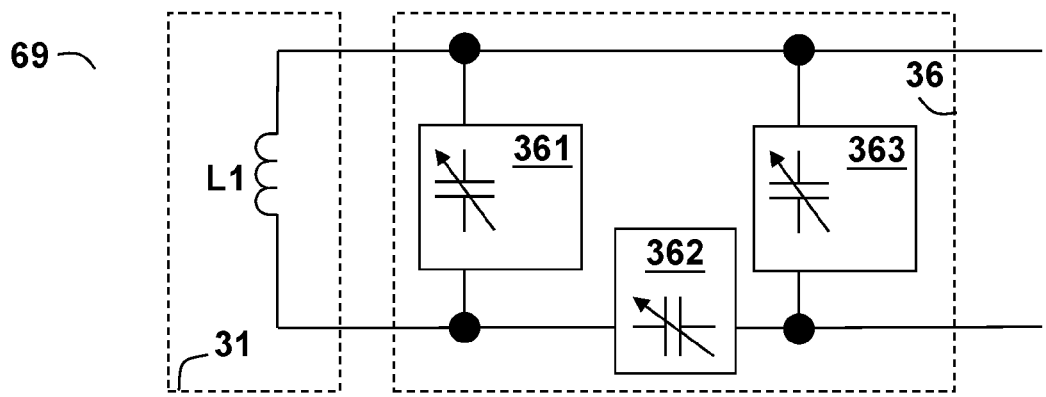

In FIG. 15E, the adjustable impedance matching circuit 36 includes variable capacitor circuits 361, 362 and 363, wherein variable capacitor circuits 361, 362 and 363 are coupled in $\pi$ form and the combination is then coupled to the receiver circuit 31 in parallel.

The aforementioned combinations of the adjustable impedance matching circuit 36 and the receiver circuit 31 are only for illustration purpose but not for limiting the scope of the present invention.

The aforementioned variable capacitor circuit (361-363) may include for example but not limited to a varactor or a combination of capacitors and switch(es). Several illustrative embodiments are described hereinafter.

Figure 16:
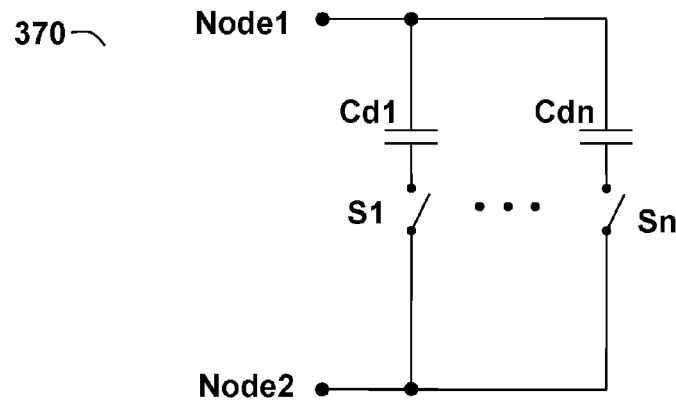
FIG. 16 shows the schematic diagram of an embodiment of the variable capacitor circuit of the resonant wireless power receiver circuit according to the present invention.

FIG. 16 shows a more specific embodiment of the aforementioned variable capacitor circuit which includes capacitors and switches. In FIG. 15, the variable capacitor circuit 370 includes impedance matching capacitors Cd1-Cdn and switches S1-Sn, wherein n≥1. Cd1-Cdn are respectively connected to corresponding switches S1-Sn in series, and the series circuits of capacitors and switches are connected in parallel to form a network. The reactance or impedance of the variable capacitor circuit 370 can be adjusted by controlling the conduction of the switches in the network through for example the aforementioned impedance control signal.

The aforementioned capacitor circuit 370 is only an example. It can also be other kinds of combinations of capacitors and switches. For example, one or more capacitors with fixed capacitance can be connected between Node1 and Node2 either in parallel or in series. As another example, it can be thus arranged that Cd1-Cdn are respectively connected to corresponding switches S1-Sn in parallel, and the parallel circuits of capacitors and switches are connected in series to form a network. As another example, plural capacitors and switches are respective connected in parallel or in series to form plural groups of capacitors switches, and then the plural groups of capacitors and switches are connected in parallel, in series, or in combination of parallel and series. Besides the aforementioned examples, there are other possible arrangements, and all such arrangements are considered within the spirit of the present invention as long as the reactance or impedance of the variable capacitor circuit 370 can be adjusted by controlling the conduction of the switches therein.

FIG. 17A-17D show another category of more specific embodiments of the variable capacitor circuit (for use as, for example, the variable capacitor circuits 361-363 shown in FIG. 14A-14D, 15A-15E), which includes at least a varactor (for example D1 in FIG. 17A-17D).

Figure 17A:
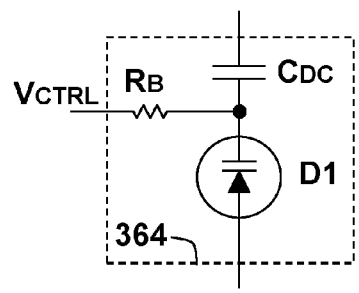
FIG. 17A-17D show schematic diagrams of several other embodiments of the variable capacitor circuit of the resonant wireless power receiver circuit according to the present invention.
Figure 17B:
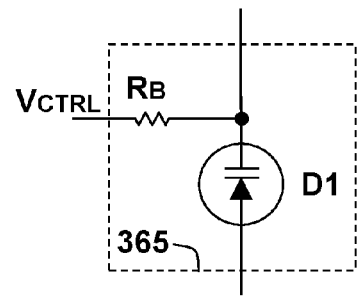
Figure 17C:
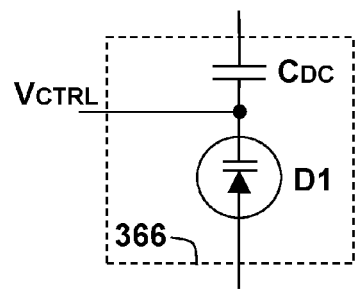
Figure 17D:
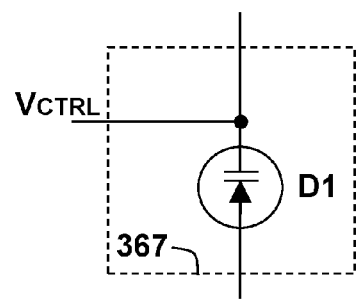

In one embodiment, for example, the varactor may be a voltage controlled varactor of which the capacitance can be adjusted by applying different levels of reverse bias voltage. Since the aforementioned voltage controlled varactor requires DC bias for operation and control, the variable capacitor circuit containing such varactor(s) may include DC bias resistor(s) or DC blocking capacitor(s) in for example but not limited to the following forms, depending on the actual application conditions. In FIG. 17A, the variable capacitor circuit 364 includes a varactor D1, a DC bias resistor RB and a DC blocking capacitor CDC. In FIG. 17B, the variable capacitor circuit 365 includes a varactor D1 and a DC bias resistor RB. In FIG. 17C, the variable capacitor circuit 366 includes a varactor D1 and a DC blocking capacitor CDC. In FIG. 17D, the variable capacitor circuit 367 includes a varactor D1. The reactance and impedance of all the aforementioned variable capacitor circuits 364-367 can be adjusted by controlling the voltage difference between VCTRL and the anode of D1.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. For example, the Minimum Output Voltage (Minimum $V_{RECT}$) control mode can be used in combination with the overvoltage protection control mode such that the rectified output voltage will be neither less than a lower limit nor higher than an upper limit. In this case, the feedback control circuit may include two comparison circuits comparing the rectified output voltage with two different reference voltages respectively. For another example, the Constant Load Impedance of Rectified Output control mode can also be used in combination with the overvoltage protection control mode, such that the rectified output voltage is not higher than an upper limit. In view of the foregoing, those skilled in this art can readily conceive variations and modifications within the spirit of the present invention. The spirit of the present invention should cover all such and other modifications and variations, which should be interpreted to fall within the scope of the following claims and their equivalents.

What is claimed is:

1. A resonant wireless power receiver circuit having a load impedance of rectified output, and configured to operably receive a wireless power and convert the wireless power to a DC conversion output which is supplied to a load, the resonant wireless power receiver circuit comprising:
   a receiver circuit, which includes at least a receiver coil;
   an adjustable impedance matching circuit, coupled to the receiver circuit, wherein the adjustable impedance matching circuit and the receiver circuit in combination are configured to operably receive the wireless power and generate a resonant output;
   a rectifier, which is coupled to the combination of the adjustable impedance matching circuit and the receiver circuit, and configured to operably rectify the resonant output to a rectified output, wherein the rectified output includes a rectified output voltage and a rectified output current;
   a DC-DC converter, which is coupled to the rectifier and the load, and configured to operably convert the rectified output to the DC conversion output, wherein the DC conversion output includes a DC conversion output current, and wherein the load impedance of rectified output includes an input impedance of the DC-DC converter; and
   a feedback control circuit, which is coupled to the rectifier and the adjustable impedance matching circuit, and configured to operably generate an impedance control signal according the rectified output voltage and the rectified output current, to control the impedance of the adjustable impedance matching circuit such that the load impedance of rectified output is regulated at a pre-determined impedance value.

2. The resonant wireless power receiver circuit of claim 1, wherein the feedback control circuit is coupled to the DC-DC converter, and is further configured to operably generate a conversion control signal, to control the DC conversion output current of the DC-DC converter according to the rectified output voltage and the rectified output current such that the rectified output voltage is not less than a pre-determined lower limit.

3. The resonant wireless power receiver circuit of claim 1, wherein the feedback control circuit includes a comparison circuit which is configured to operably compare the rectified output voltage with a reference voltage; wherein the feedback control circuit is configured to operably generate the impedance control signal according to an output signal of the comparison circuit, to control the impedance of the adjustable impedance matching circuit such that the rectified output voltage is not higher than a pre-determined upper limit.

4. The resonant wireless power receiver circuit of claim 1,
   wherein the adjustable impedance matching circuit includes one or more variable capacitor circuits;
   wherein the feedback control circuit is configured to operably adjust the reactance of the one or more variable capacitor circuits according to the impedance control signal so as to adjust the impedance of the adjustable impedance matching circuit;
   wherein the one or more variable capacitor circuits and the receiver circuit are connected in parallel, in series, or in combination of parallel and series; and wherein when there are two or more variable capacitor circuits, the two or more variable capacitor circuits are connected in parallel, in series, or in combination of parallel and series.

5. The resonant wireless power receiver circuit of claim 4, wherein the variable capacitor circuit includes at least a varactor, and wherein the feedback control circuit is configured to operably adjust the reactance of the varactor according to the impedance control signal, to thereby adjust the reactance of the variable capacitor circuit.

6. The resonant wireless power receiver circuit of claim 4, wherein the variable capacitor circuit includes one or more switches and one or more capacitors, wherein the one or more switches and one or more capacitors are connected in parallel, in series, or in combination of parallel and series; and wherein the feedback control circuit is configured to operably control the conduction of the one or more switches according to the impedance control signal, to thereby adjust the reactance of the variable capacitor circuit.

7. A resonant wireless power receiver circuit, which has a load impedance of rectified output, and configured to operably receive a wireless power and convert the wireless power to a DC conversion output to a load, the resonant wireless power receiver circuit comprising:
a receiver circuit, which includes at least a receiver coil;
an adjustable impedance matching circuit, coupled to the receiver circuit, wherein the adjustable impedance matching circuit and the receiver circuit in combination are configured to operably receive the wireless power and generate a resonant output;
a rectifier, which is coupled to the combination of the adjustable impedance matching circuit and the receiver circuit, and configured to operably rectify the resonant output to a rectified output, wherein the rectified output includes a rectified output voltage and a rectified output current;
a DC-DC converter, which is coupled to the rectifier and the load, and configured to operably convert the rectified output to the DC conversion output, wherein the DC conversion output includes a DC conversion output current, and wherein the load impedance of rectified output includes an input impedance of the DC-DC converter; and
a feedback control circuit, which is coupled to the adjustable impedance matching circuit, and configured to operably generate an impedance control signal according the rectified output voltage, to control the impedance of the adjustable impedance matching circuit such that the rectified output voltage is regulated at a pre-determined voltage value.

8. The resonant wireless power receiver circuit of claim 7, wherein the feedback control circuit includes a comparison circuit which is configured to operably compare the rectified output voltage with a reference voltage, and wherein the feedback control circuit is configured to operably generate the impedance control signal according to an output signal of the comparison circuit.

9. The resonant wireless power receiver circuit of claim 7, wherein the feedback control circuit is coupled to the DC-DC converter, and is further configured to operably generate a conversion control signal, to control the DC conversion output current of the DC-DC converter according to the rectified output voltage and the rectified output current such that the rectified output voltage is not less than a pre-determined lower limit.

10. The resonant wireless power receiver circuit of claim 7, wherein the feedback control circuit includes a comparison circuit which is configured to operably compare the rectified output voltage with a reference voltage; wherein the feedback control circuit is configured to operably generate the impedance control signal according to an output signal of the comparison circuit, to control the impedance of the adjustable impedance matching circuit such that the rectified output voltage is not higher than a pre-determined upper limit.

11. The resonant wireless power receiver circuit of claim 7,
wherein the adjustable impedance matching circuit includes one or more variable capacitor circuits;
wherein the feedback control circuit is configured to operably adjust the reactance of the one or more variable capacitor circuits according to the impedance control signal so as to adjust the impedance of the adjustable impedance matching circuit;
wherein the one or more variable capacitor circuits and the receiver circuit are connected in parallel, in series, or in combination of parallel and series; and
wherein when there are two or more variable capacitor circuits, the two or more variable capacitor circuits are connected in parallel, in series, or in combination of parallel and series.

12. The resonant wireless power receiver circuit of claim 11, wherein the variable capacitor circuit includes at least a varactor, and wherein the feedback control circuit is configured to operably adjust the reactance of the varactor according to the impedance control signal, to thereby adjust the reactance of the variable capacitor circuit.

13. The resonant wireless power receiver circuit of claim 11, wherein the variable capacitor circuit includes one or more switches and one or more capacitors, wherein the one or more switches and one or more capacitors are connected in parallel, in series, or in combination of parallel and series; and wherein the feedback control circuit is configured to operably control the conduction of the one or more switches according to the impedance control signal, to thereby adjust the reactance of the variable capacitor circuit.

14. A feedback control circuit, which is configured to operably control a resonant wireless power receiver circuit which has a load impedance of rectified output, wherein the resonant wireless power receiver circuit is configured to operably receive a wireless power and convert the wireless power to a DC conversion output to a load, the resonant wireless power receiver circuit comprising a receiver circuit, which includes at least a receiver coil; an adjustable impedance matching circuit, coupled to the receiver circuit, wherein the adjustable impedance matching circuit and the receiver circuit in combination are configured to operably receive the wireless power and generate a resonant output; a rectifier, which is coupled to the combination of the adjustable impedance matching circuit and the receiver circuit, and configured to operably rectify the resonant output to a rectified output, wherein the rectified output includes a rectified output voltage and a rectified output current; and a DC-DC converter, which is coupled to the rectifier and the load, and configured to operably convert the rectified output to the DC conversion output, wherein the DC conversion output includes a DC conversion output current, and wherein the load impedance of rectified output includes an input impedance of the DC-DC converter; the feedback control circuit being coupled to the rectifier and the adjustable impedance matching circuit, and comprising:
a reference voltage generator, which is configured to operably generate a first reference voltage according to the rectified output current, wherein the first reference voltage corresponds to the product of the rectified output current multiplied by a pre-determined impedance value; and an impedance controller, which is configured to operably generate an impedance control signal according to the rectified output voltage and the first reference voltage, to control the impedance of the adjustable impedance matching circuit such that the rectified output voltage corresponds to the first reference voltage, to thereby regulate the load impedance of rectified output at the pre-determined impedance value.

15. The feedback control circuit of claim 14, which is coupled to the DC-DC converter, and further comprising:

a second comparison circuit, which is configured to operably compare the rectified output voltage with a second reference voltage;

wherein the impedance controller is configured to operably generate the impedance control signal further according to the output signal of the second comparison circuit and the rectified output current, to control the impedance of the adjustable impedance matching circuit, and the impedance controller is configured to operably generate a conversion control signal to control the DC conversion output current of the DC-DC converter, such that the rectified output voltage is not lower than a pre-determined lower limit.

16. The feedback control circuit of claim 14, which is coupled to the DC-DC converter, and further comprising:

a second comparison circuit, which is configured to operably compare the rectified output voltage with a second reference voltage;

wherein the impedance controller is configured to operably generate the impedance control signal further according to the output signal of the second comparison circuit, to control the impedance of the adjustable impedance matching circuit such that the rectified output voltage is not higher than a pre-determined upper limit.

17. A feedback control circuit, which is configured to operably control a resonant wireless power receiver circuit, wherein the resonant wireless power receiver circuit is configured to operably receive a wireless power and convert the wireless power to a DC conversion output to a load, the resonant wireless power receiver circuit comprising a receiver circuit, which includes at least a receiver coil; an adjustable impedance matching circuit, coupled to the receiver circuit, wherein the adjustable impedance matching circuit and the receiver circuit in combination are configured to operably receive the wireless power and generate a resonant output; a rectifier, which is coupled to the combination of the adjustable impedance matching circuit and the receiver circuit, and configured to operably rectify the resonant output to a rectified output, wherein the rectified output includes a rectified output voltage and a rectified output current; and a DC-DC converter, which is coupled to the rectifier and the load, and configured to operably convert the rectified output to the DC conversion output, wherein the DC conversion output includes a DC conversion output current, and wherein the load impedance of rectified output includes an input impedance of the DC-DC converter; the feedback control circuit being coupled to the rectifier and the adjustable impedance matching circuit, and comprising:

a first comparison circuit, which is configured to operably generate an error amplification signal according to the rectified output voltage and a first reference voltage; and an impedance controller, which is configured to operably generate an impedance control signal according to the error amplification signal, to control the impedance of the adjustable impedance matching circuit such that the rectified output voltage is regulated at a pre-determined voltage value.

18. The feedback control circuit of claim 17, which is coupled to the DC-DC converter, and further comprising:

a second comparison circuit, which is configured to operably compare the rectified output voltage with a second reference voltage;

wherein the impedance controller is configured to operably generate the impedance control signal further according to the output signal of the second comparison circuit and the rectified output current, to control the impedance of the adjustable impedance matching circuit, and the impedance controller is configured to operably generate a conversion control signal to control the DC conversion output current of the DC-DC converter, such that the rectified output voltage is not lower than a pre-determined lower limit.

19. The feedback control circuit of claim 17, which is coupled to the DC-DC converter, and further comprising:

a second comparison circuit, which is configured to operably compare the rectified output voltage with a second reference voltage;

wherein the impedance controller is configured to operably generate the impedance control signal further according to the output signal of the second comparison circuit, to control the impedance of the adjustable impedance matching circuit such that the rectified output voltage is not higher than a pre-determined upper limit.

20. A method for controlling a resonant wireless power receiver circuit which has a load impedance of rectified output, wherein the resonant wireless power receiver circuit is configured to operably receive a wireless power and convert the wireless power to a DC conversion output to a load, the resonant wireless power receiver circuit comprising a receiver circuit, which includes at least a receiver coil; an adjustable impedance matching circuit, coupled to the receiver circuit, wherein the adjustable impedance matching circuit and the receiver circuit in combination are configured to operably receive the wireless power and generate a resonant output; a rectifier, which is coupled to the combination of the adjustable impedance matching circuit and the receiver circuit, and configured to operably rectify the resonant output to a rectified output, wherein the rectified output includes a rectified output voltage and a rectified output current; and a DC-DC converter, which is coupled to the rectifier and the load, and configured to operably convert the rectified output to the DC conversion output, wherein the DC conversion output includes a DC conversion output current, and wherein the load impedance of rectified output includes an input impedance of the DC-DC converter, the control method comprising:

generating an impedance control signal according the rectified output voltage and the rectified output current; and controlling the impedance of the adjustable impedance matching circuit according to the impedance control signal, such that the load impedance of rectified output is regulated at a pre-determined impedance value.

21. The method for controlling a resonant wireless power receiver circuit of claim 20, further comprising:

generating a conversion control signal according to the rectified output voltage and the rectified output current; and controlling the DC conversion output current of the DC-DC converter, such that the rectified output voltage is not lower than a pre-determined lower limit.

22. The method for controlling a resonant wireless power receiver circuit of claim 20, wherein the step of generating the impedance control signal includes:

comparing the rectified output voltage with a first reference voltage to generate a comparison result; and generating the impedance control signal according to comparison result.

23. The method for controlling a resonant wireless power receiver circuit of claim 20, further comprising:

comparing the rectified output voltage with a second reference voltage to generate a comparison result; and generating the impedance control signal according to the comparison result to control the impedance of the adjustable impedance matching circuit, such that the rectified output voltage is not higher than a pre-determined upper limit voltage value.

24. The method for controlling a resonant wireless power receiver circuit of claim 22, further comprising:

comparing the rectified output voltage with a second reference voltage to generate a comparison result; and generating the impedance control signal according to the comparison result to control the impedance of the adjustable impedance matching circuit, such that the rectified output voltage is not higher than a pre-determined upper limit voltage value.

25. The method for controlling a resonant wireless power receiver circuit of claim 20, wherein the adjustable impedance matching circuit includes one or more variable capacitor circuits;

wherein the one or more variable capacitor circuits and the receiver circuit are connected in parallel, in series, or in combination of parallel and series, and wherein when there are two or more variable capacitor circuits, the two or more variable capacitor circuits are connected in parallel, in series, or in combination of parallel and series;

wherein the control method further comprises:
adjusting the reactance of the variable capacitor circuit according to the impedance control signal so as to adjust the impedance of the adjustable impedance matching circuit.

26. A method for controlling a resonant wireless power receiver circuit which is configured to operably receive a wireless power and convert the wireless power to a DC conversion output to a load, the resonant wireless power receiver circuit comprising a receiver circuit, which includes at least a receiver coil; an adjustable impedance matching circuit, coupled to the receiver circuit, wherein the adjustable impedance matching circuit and the receiver circuit in combination are configured to operably receive the wireless power and generate a resonant output; a rectifier, which is coupled to the combination of the adjustable impedance matching circuit and the receiver circuit, and configured to operably rectify the resonant output to a rectified output, wherein the rectified output includes a rectified output voltage and a rectified output current; and a DC-DC converter, which is coupled to the rectifier and the load, and configured to operably convert the rectified output to the DC conversion output, wherein the DC conversion output includes a DC conversion output current, and wherein the load impedance of rectified output includes an input impedance of the DC-DC converter, the control method comprising:

generating an impedance control signal according to the rectified output voltage; and controlling the impedance of the adjustable impedance matching circuit according to the impedance control signal, such that the rectified output voltage is regulated at a pre-determined voltage value.

27. The method for controlling a resonant wireless power receiver circuit of claim 26, further comprising:

generating a conversion control signal according to the rectified output voltage and the rectified output current; and controlling the DC conversion output current of the DC-DC converter, such that the rectified output voltage is not lower than a pre-determined lower limit.

28. The method for controlling a resonant wireless power receiver circuit of claim 26, further comprising:

comparing the rectified output voltage with a reference voltage to generate a comparison result; and generating the impedance control signal according to the comparison result to control the impedance of the adjustable impedance matching circuit, such that the rectified output voltage is not higher than a pre-determined upper limit voltage value.

29. The method for controlling a resonant wireless power receiver circuit of claim 26, further comprising:

comparing the rectified output voltage with a reference voltage to generate a comparison result; and generating the impedance control signal according to the comparison result to control the impedance of the adjustable impedance matching circuit, such that the rectified output voltage is not higher than a pre-determined upper limit voltage value.

30. The method for controlling a resonant wireless power receiver circuit of claim 26, wherein the adjustable impedance matching circuit includes one or more variable capacitor circuits;

wherein the one or more variable capacitor circuits and the receiver circuit are connected in parallel, in series, or in combination of parallel and series, and wherein when there are two or more variable capacitor circuits, the two or more variable capacitor circuits are connected in parallel, in series, or in combination of parallel and series;

wherein the control method further comprises:
adjusting the reactance of the variable capacitor circuit according to the impedance control signal so as to adjust the impedance of the adjustable impedance matching circuit.

* * * * *